(12) United States Patent
Baskin

(10) Patent No.: US 11,280,376 B2
(45) Date of Patent: Mar. 22, 2022

(54) CLUTCH APPARATUS, SYSTEMS, AND RELATED METHODS FOR USE WITH VEHICLE STABILIZER BARS

(71) Applicant: TOYOTA MOTOR ENGINEERING & MANUFACTURING NORTH AMERICA, INC., Plano, TX (US)

(72) Inventor: Bradley S. Baskin, Saline, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/903,669

(22) Filed: Jun. 17, 2020

(65) Prior Publication Data

US 2021/0396279 A1     Dec. 23, 2021

(51) Int. Cl.
*F16D 37/00*     (2006.01)
*B60G 17/015*    (2006.01)
(Continued)

(52) U.S. Cl.
CPC ....... *F16D 37/008* (2013.01); *B60G 17/0152* (2013.01); *B60G 21/0556* (2013.01);
(Continued)

(58) Field of Classification Search
CPC ........ F16D 37/008; F16D 37/02; F16D 43/28; F16D 48/02; F16D 2048/0227; F16D 2048/0233; F16D 2048/0245; F16D 2048/0248; F16D 48/06; F16D 48/064; F16D 48/066; B60G 21/0556;
(Continued)

(56) References Cited

U.S. PATENT DOCUMENTS 2,886,151 A * 5/1959 Winslow ............... F16D 37/008
                                                       192/21.5
5,735,540 A    4/1998 Schiffler
(Continued)

FOREIGN PATENT DOCUMENTS

FR    2834025 A1 * 6/2003   ............. F16D 21/06
JP    3682333 B2    8/2005
(Continued)

*Primary Examiner* — Jonathan Ng
*Assistant Examiner* — Daniel M. Keck
(74) *Attorney, Agent, or Firm* — Oblon, McClelland, Maier & Neustadt, L.L.P.

(57) ABSTRACT

Clutch apparatus, systems, and related methods for use with vehicle stabilizer bars are disclosed. A disclosed stabilizer bar disconnect system includes a fluidic clutch configured to control torque transferred between first and second bar members during a driving event to control a roll stiffness of a vehicle. The fluidic clutch includes: a housing, a fluid chamber in the housing; a fluid reservoir in fluid communication with the fluid chamber; first and second fluid control members in the fluid chamber and connected to the first and second bar members, and fluid valves configured to control a flow of a fluid through the fluid chamber and the fluid reservoir. The fluidic clutch is changeable between a connected state in which the fluidic clutch couples the first bar member to the second bar member and a disconnected state in which the fluidic clutch decouples the first bar member from the second bar member.

16 Claims, 13 Drawing Sheets

(51) Int. Cl.
  *B60G 21/055* (2006.01)
  *F16D 48/06* (2006.01)
(52) U.S. Cl.
  CPC ...... *F16D 48/066* (2013.01); *B60G 2202/135* (2013.01); *B60G 2204/82* (2013.01); *B60G 2400/0511* (2013.01)
(58) Field of Classification Search
  CPC .......... B60G 17/0152; B60G 2202/135; B60G 2204/82; B60G 2400/0511; B60G 21/073; B60G 21/0558
  See application file for complete search history.

(56) References Cited

U.S. PATENT DOCUMENTS

| | | | |
|---|---|---|---|
| 5,779,013 A | 7/1998 | Bansbach | |
| 6,513,819 B1 * | 2/2003 | Oliver | B60G 21/0553 280/124.106 |
| 6,637,757 B2 | 10/2003 | Ignatius et al. | |
| 7,207,574 B2 * | 4/2007 | Gradu | B60G 21/0555 267/277 |
| 7,287,759 B2 | 10/2007 | Uchiyama et al. | |
| 7,837,202 B2 | 11/2010 | Taneda et al. | |
| 8,167,319 B2 | 5/2012 | Ogawa | |
| 8,690,175 B2 | 4/2014 | Brown | |
| 9,353,846 B2 * | 5/2016 | Pump | F16H 57/042 |
| 9,878,589 B2 | 1/2018 | Park et al. | |
| 10,935,088 B2 * | 3/2021 | Morino | F16H 61/0021 |
| 2006/0272916 A1 * | 12/2006 | Robb | F16D 37/02 192/21.5 |
| 2017/0129302 A1 | 5/2017 | Jackson | |
| 2019/0024732 A1 * | 1/2019 | Heubner | F16D 48/02 |
| 2020/0198435 A1 * | 6/2020 | Dhanraj | B60G 21/0558 |

FOREIGN PATENT DOCUMENTS

| | | | | |
|---|---|---|---|---|
| WO | WO-8907541 A1 * | 8/1989 | ............ | F16D 48/02 |
| WO | WO-2011072635 A1 * | 6/2011 | ............ | F16L 55/041 |

* cited by examiner

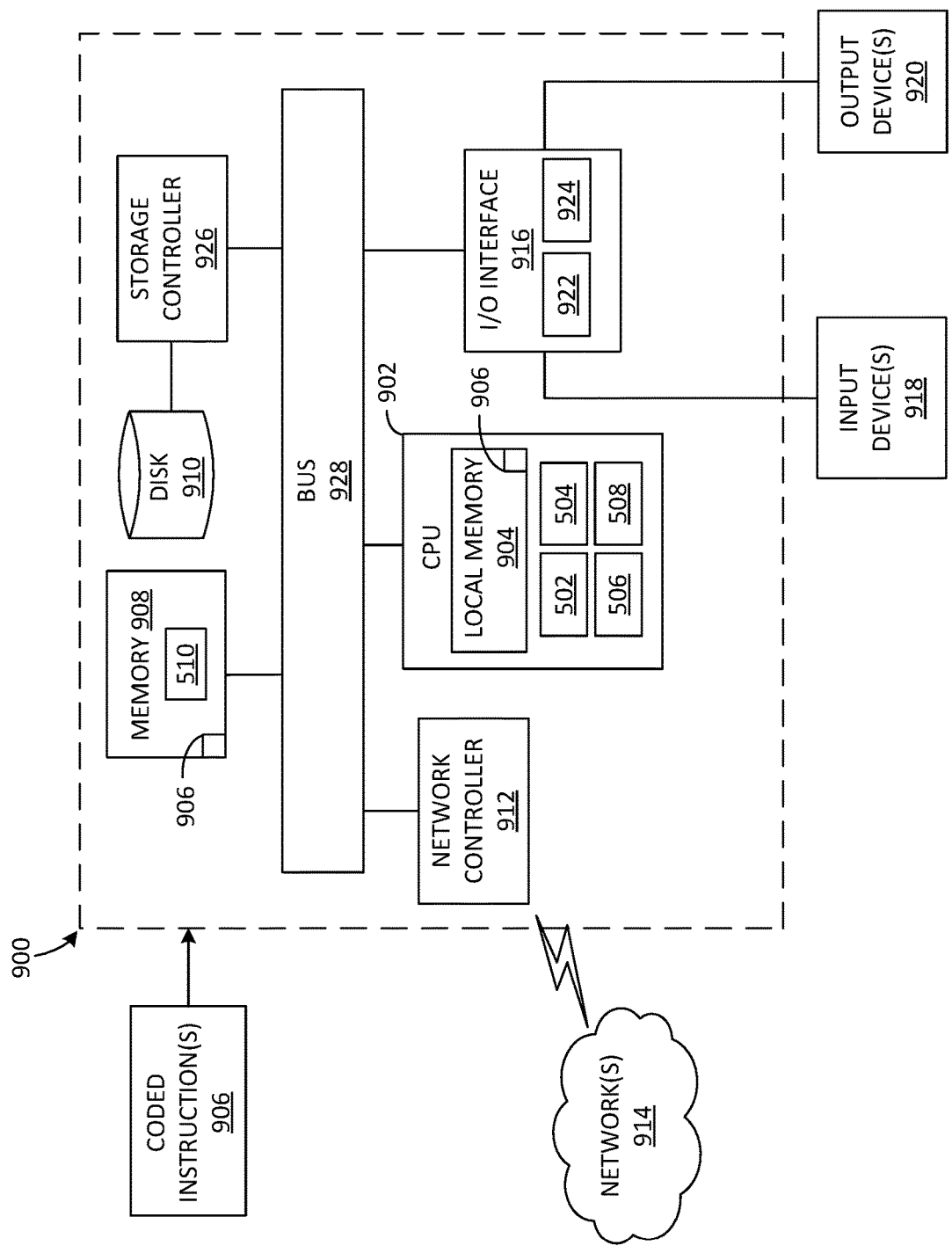

CLUTCH APPARATUS, SYSTEMS, AND RELATED METHODS FOR USE WITH VEHICLE STABILIZER BARS

FIELD OF THE DISCLOSURE

This disclosure relates generally to clutches and, more particularly, to clutch apparatus, systems, and related methods for use with vehicle stabilizer bars.

BACKGROUND

Motor vehicles typically employ stabilizer bars (sometimes referred to as anti-sway bars, anti-roll bars, sway bars, and/or roll bars) configured to reduce vehicle body roll while a vehicle is driving or performing a certain maneuver (e.g., a relatively high speed turn). To improve vehicle ride quality and/or handling in certain driving conditions, some stabilizer bars or operating characteristics thereof can be adjusted on the fly.

SUMMARY

An aspect of the present disclosure includes a stabilizer bar disconnect system for a vehicle. The stabilizer bar disconnect system includes a stabilizer bar on the vehicle and a fluidic clutch operatively interposed between first and second bar members of the stabilizer bar. The fluidic clutch is configured to control torque transferred between the first and second bar members during a driving event to control a roll stiffness of the vehicle. A housing can be rotatably coupled to the first and second bar members. A fluid chamber in the housing can receive a fluid. A fluid reservoir can be external to the fluid chamber and in fluid communication with the fluid chamber. First and second fluid control members can be positioned in the fluid chamber and connected to respective ones of the first and second bar members. Relative rotation of the first or second fluid control member about an axis changes a parameter of the fluid. Fluid valves can be operatively coupled to the housing and configured to control a flow of the fluid through the fluid chamber and the fluid reservoir. The fluidic clutch is changeable between (a) a connected state in which the fluidic clutch couples the first bar member to the second bar member and (b) a disconnected state in which the fluidic clutch decouples the first bar member from the second bar member.

Another aspect of the present disclosure includes a vehicle stabilizer bar assembly. The vehicle stabilizer bar assembly includes a first bar member connectable to a first side of a vehicle, a second bar member connectable to a second side of a vehicle, and a clutch mechanism operatively coupling the first bar member to the second bar member. The clutch mechanism is configured to control torque transferred between the first and second bar members during a driving event to control a roll stiffness of the vehicle. A housing can be interposed between the first and second bar members. A fluid chamber in the housing can receive a fluid. A fluid reservoir external to the fluid chamber can be in fluid communication with the fluid chamber. First and second fluid control members can be connected to the respective first and second bar members and extend through the fluid chamber along an axis. Relative rotation of the first or second fluid control member about the axis changes a parameter of the fluid. Fluid valves can be operatively coupled to the housing to control a flow of the fluid through the fluid chamber and the fluid reservoir. One or more of the fluid valves are configured to change position to adjust energy transmitted through the fluid from the first fluid control member to the second fluid control member.

The foregoing paragraphs have been provided by way of general introduction, and are not intended to limit the scope of the following claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 9 is a block diagram of an example processor platform structured to execute instructions to carry out the methods of FIGS. 6-8 and/or, more generally, to implement the example stabilizer bar disconnect system of FIG. 1B and/or the example control system of FIG. 5.

In general, the same reference numbers will be used throughout the drawing(s) and accompanying written description to refer to the same or like parts.

DETAILED DESCRIPTION

Figure 1A:
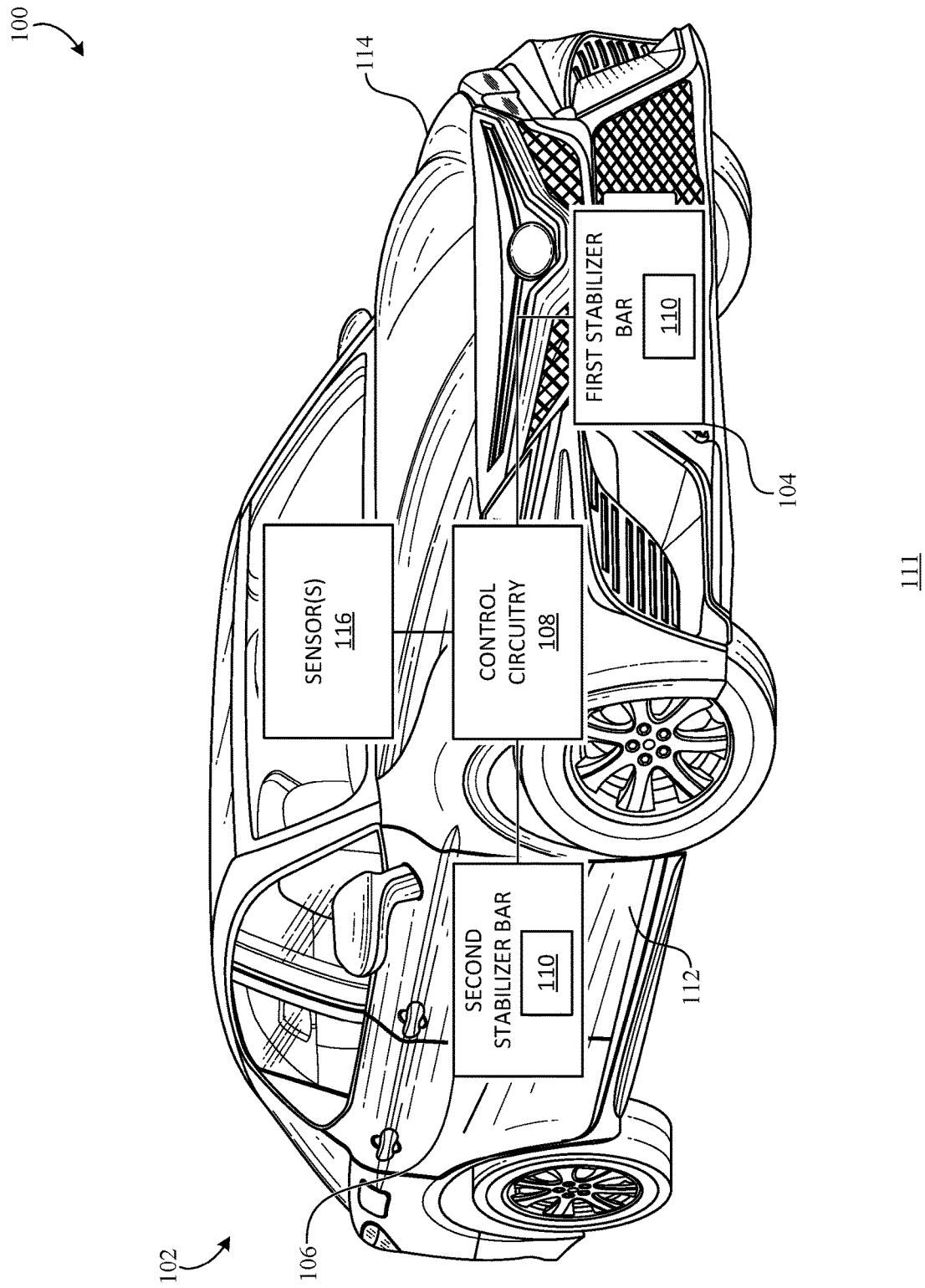
FIG. 1A illustrates a schematic diagram of a stabilizer bar disconnect system that includes at least one vehicle stabilizer bar and control circuitry for operating the vehicle stabilizer bar in accordance with the teachings of this disclosure.

Conventional stabilizer disconnect systems can be either mechanical or hydraulic. Mechanical disconnect systems typically employ large motor clutches with numerous housing and gearing components. Such mechanical disconnect systems are relatively heavy and take up substantial space in a vehicle, which is not desirable and may reduce vehicle fuel economy. For example, a mechanical disconnect system can be configured to attach a first gear to a left-hand side of a stabilizer bar and a second gear to a right-hand side of the stabilizer bar and then couple the gears with a third gear that is attached to an actuator. Due to the relatively high torque loads often required by stabilizer bars, the gears are very large so that actuator housing is also loud. Also, related hydraulic devices typically require large fluidic chambers and pumps sometimes creating extensive systems throughout a vehicle underbody. Additionally, electrical failure of these conventional clutch-based systems results in a disconnected stabilizer bar, which can pose risks to a driver or vehicle occupant.

Clutch apparatus, systems, and related methods for use with vehicle stabilizer bars are disclosed. Examples disclosed herein provide a low-profile, lightweight, and simple solution to advantageously control roll stiffness of a vehicle. Some disclosed examples provide a stabilizer bar disconnect system including an exemplary clutch mechanism (e.g., a fluidic clutch) configured to operatively couple first and second bar members of a vehicle stabilizer bar together. The first bar member can be connected to a first vehicle structure (e.g., a suspension component such as control arm and the like) corresponding to a first side of the vehicle, and the second bar member can be connected to a second vehicle structure (e.g., a suspension component such as a control arm and the like) corresponding to a second side of the vehicle opposite to the first side. In particular, the disclosed clutch mechanism is configured to control torque transferred between the first and second bar members during a certain driving event (e.g., when the vehicle is turning and/or traveling over an irregular road surface), thereby controlling the roll stiffness of the vehicle. As will be discussed in greater detail below in connection with the figures, the clutch mechanism achieves such torque transfer via an example fluid (e.g., a damping fluid that is incompressible) and example fluid control members (e.g., paddles), each of which is advantageously implemented in a housing of the clutch mechanism (e.g., a sealed housing defining one or more internal fluid chambers).

Generally speaking, the disclosed clutch mechanism is configured to have different states and/or change between the different states. Each state of the clutch mechanism is associated with a unique operating characteristic of the clutch mechanism. In some examples, when in a first state (e.g., a connected state), the clutch mechanism is configured to substantially couple or connect the first bar member to the second bar member, where torque is transferrable from the first bar member to the second bar member and/or vice versa. In such examples, energy input to the clutch mechanism by one of the bar members is transmitted to the other one of the bar members via the fluid and the fluid control members such that the clutch mechanism and the two bar members, together, act as a stabilizer bar that is substantially stiff. Conversely, in some examples, when in a second state (e.g., a disconnected state) different from the first state, the clutch mechanism is configured to substantially decouple or disconnect the first bar member from the second bar member, where torque is not transferrable from the first bar member to the second bar member and/or vice versa. In such examples, the energy input to the clutch mechanism by one of the bar members is substantially dissipated within the clutch mechanism via the fluid and the fluid control members such that each of the bar members can rotate independently relatively to each other. Such a disconnected clutch state is particularly advantageous in certain low-speed driving conditions (e.g., when driving off-road). Additionally or alternatively, one or more other or different states (e.g., a partially connected state) of the disclosed clutch mechanism can be achieved, which will be discussed further below. To facilitate providing the different states of the clutch mechanism and/or transitioning the clutch between the different states, some disclosed examples provide one or more example fluid valves that are operatively coupled to the clutch mechanism or the housing thereof.

The disclosed housing is rotatably coupled to the first and second bar members and can be supported by the first and second bar members. Each of the first and second bar members pass into the housing at opposite ends thereof, for example, such that an end of the first bar member in the housing is spaced from and/or faces an end of the second bar member in the housing. A first fluid flow control member (e.g., a paddle) can be fixedly coupled to the end of the first bar member, and a second fluid flow control member (e.g., a paddle) can be fixedly coupled to the end of the second bar member. In particular, a primary fluid chamber (e.g., a hydraulic fluid chamber) is in the housing between the first and second bar members and fluidly coupled to a secondary fluid chamber (e.g., a fluid reservoir) that is external to the primary fluid chamber. The disclosed fluid is disposed in the primary fluid chamber along with the fluid control members. More particularly, the first fluid control member and/or the second fluid control member can rotate relative to the housing about an axis of the housing during the driving event, thereby changing one or more parameters (e.g., a fluid pressure, a flow rate, and the like) of the fluid in the primary fluid chamber.

Figure 3A:
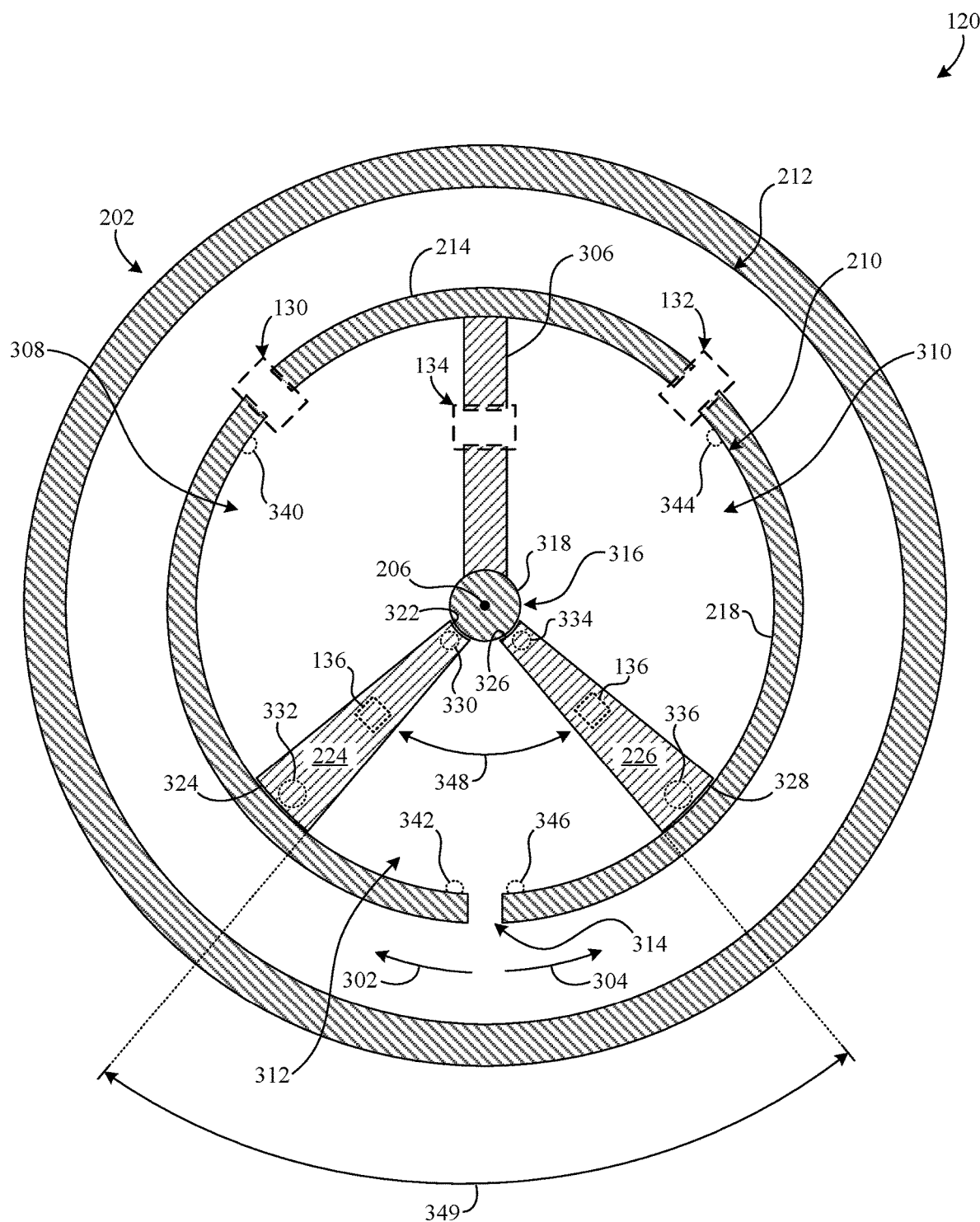
FIG. 3A is a cross-sectional view of the clutch mechanism taken along lines A-A of FIG. 2B and shows an implementation of the clutch mechanism.

The disclosed fluid control members extend through the primary fluid chamber along the axis of the housing to create different sections of the primary fluid chamber that are radially distributed relative to the axis and substantially sealed off from each other (e.g., see FIG. 3A). To facilitate sealing off the different sections the primary fluid chamber and/or guiding angular movement of the fluid control members, some disclosed examples provide an example spool centrally disposed in the primary fluid chamber, such that each of fluid control members is positioned between an outer sealing surface on the spool an inner sealing surface on a portion of the housing. Further, a wall in the primary fluid chamber, which partially defines two sections of the primary fluid chamber, can be utilized to attach the spool to the portion of the housing. In particular, the disclosed fluid valves can be fluidly interposed between at least some of the sections of the primary fluid chamber and the secondary fluid chamber, which facilitates controlling the parameter(s) of the fluid during clutch operation. As will be discussed in greater detail below, the disclosed clutch mechanism is configured to transfer energy through the fluid from the first fluid control member to the second fluid control member and/or cease transferring the energy, depending on positions of the respective fluid valves.

In some examples when the clutch mechanism is in the connected state, the first fluid control member can push and/or impart a force on the fluid to increase the fluid pressure in two sections of the primary fluid chamber in response to the first bar member applying an input torque to the first fluid control member. As a result, in such examples, the fluid pushes and/or imparts a force the second fluid control member, thereby generating an output torque of the clutch mechanism that is applied to second bar member. On the other hand, in some examples when the clutch mechanism is in the disconnected state, the fluid is expelled from the primary fluid chamber and/or urged to flow through the secondary fluid chamber in response to the first bar member applying the input torque to the first fluid control member. In such examples, the first and second fluid control members can rotate independently relative to each other about the axis due to the ability of the fluid to freely flow through one or more of the valves and, in some examples, through an orifice positioned on a portion of the housing and fluidly coupling the primary fluid chamber to the secondary fluid chamber. Thus, to reduce an amount of the energy transferred through the fluid from one of the fluid control members to the other one of the fluid control members, one or more of the fluid valves can open to enable the fluid to freely flow through the secondary fluid chamber between at least two sections of the primary fluid chamber.

By utilizing the fluid and the fluid control members in such a manner to control a connection between the first and second bar members, examples disclosed herein eliminate large tanks, chambers, hoses, and/or related systems in a vehicle underbody often required by the above-mentioned known systems. In addition, the disclosed clutch mechanism is relatively quiet and more low-profile and/or lightweight compared to the above-mentioned known systems. Further, the disclosed system can be configured to be normally closed such that electrical failure results in the clutch mechanism transitioning to and/or maintaining the connected state, which improves vehicle safety in such an event.

The disclosed clutch mechanism can be substantially self-contained, except for electrical signals provided to the fluid valves. In some examples, the disclosed system can be provided with example control circuitry for controlling the clutch mechanism. The control circuitry is electrically coupled to fluid valves of the clutch mechanism and configured to control the state of the clutch mechanism by particularly operating the fluid valves. In such examples, the disclosed control circuitry can operate the fluid valves to toggle the roll stiffness of the vehicle between high and low, for example, depending on the needs of a driver or vehicle owner and/or a detected vehicle condition or event. Accordingly, the control circuitry can be communicatively coupled to one or more vehicle systems and/or one or more sensors configured to generate data of interest that may be associated with the vehicle and/or the clutch mechanism.

In some examples, one or more proximity sensors can be operatively coupled to the clutch mechanism and communicatively coupled to the control circuitry. For example, a first proximity sensor can be positioned on the first fluid control member or the first bar member, and/or a second proximity sensor can be positioned on the second fluid control member or the second bar member. In particular, the proximity sensor(s) is/are configured to generate sensor data indicative of positions (e.g., angular positions) of the respective fluid control members. In some examples, the control circuitry is configured to detect, via the proximity sensor(s), a gap between the first and second fluid control members and/or a size of the gap. In such examples, if the control circuitry determines that the size of the gap is less than a threshold gap size, the control circuitry is configured to the disable the disconnected state of the clutch mechanism until the first and second bar members are far enough apart to safely engage or activate the disconnected state. Additionally or alternatively, in such examples, if the control circuitry determines that the size of the gap is less than the threshold gap size, the control circuitry is configured to selectively open and close at least some of the fluid valves such that (a) the first bar member gradually normalizes to a starting or initial position of the first bar member and/or (b) the second bar member gradually normalizes to a starting or initial position of the second bar member.

In some examples, in addition or alternatively to the proximity sensor(s), the clutch mechanism may be provided with one or more travel stops configured to limit relative rotation of the first fluid control member and/or the second fluid control member. In particular, the travel stops ensure that the first and second fluid control members do not contact each other during clutch operation.

Additionally, in some examples, the fluid can be implemented using one or more fluids responsive to an electric current. For example, the fluid or at least a portion thereof can include a magnetorheological (MR) fluid, which can improve clutch performance in certain conditions. In such examples, the control circuitry is configured to apply an electric current to the fluid when the clutch mechanism is in the connected state, thereby changing one or more characteristics (e.g., any of viscosity, stiffness, and the like) of the fluid or a portion thereof in the primary fluid chamber. As a result of the applied electric current, stiffness and/or viscosity of the fluid may increase to better enable the clutch mechanism to connect the first and second bar members together. On the other hand, the control circuitry can be configured to cease applying the electric current to the fluid when the clutch mechanism is in the disconnected state. Due to cessation of the applied electric, the stiffness and/or the viscosity of the fluid may decrease current to better enable the clutch mechanism to disconnect the first and second bar members from each other.

FIG. 1A illustrates a schematic diagram of an example stabilizer bar disconnect system 100 in which examples disclosed herein can be implemented. The stabilizer bar disconnect system 100 of FIG. 1 can include a vehicle (e.g., a motor vehicle) 102 such as, for example, one of a car, a truck, a van, a sport utility vehicle (SUV), and the like, or any other suitable vehicle. Additionally, the system 100 includes one or more vehicle stabilizer bars 104, 106 and control circuitry 108 operatively coupled to the vehicle stabilizer bar(s) 104, 106, which facilitate controlling vehicle roll stiffness. As shown in FIG. 1A, a first stabilizer bar 104 can be installed in a front area of the vehicle 102, while a second stabilizer bar 106 can be installed in a rear area of the vehicle 102. Each of the stabilizer bar(s) 104, 106 of the vehicle 102 can include an exemplary stabilizer bar assembly 110, which is discussed further below. In particular, the control circuitry 108 is configured to control the stabilizer bar(s) 104, 106 to adjust or vary a roll stiffness of the vehicle 102 in certain conditions and/or while the vehicle 102 is driving.

In some examples, the control circuitry 108 can be configured to toggle the roll stiffness from low to high, for example, in response (a) to receiving data of interest from the vehicle 102 or a system thereof indicative of toggling the roll stiffness and/or (b) detecting that a certain driving event is occurring or likely to occur imminently. Conversely, in some examples, the control circuitry 108 can be configured to toggle the roll stiffness from high to low, for example, in response to (a) receiving the data of interest from the vehicle 102 and/or (b) detecting completion of the driving event. The driving event includes, for example, the vehicle 102 performing a certain maneuver (e.g., a relatively high speed turn) in which substantial lateral force(s) is/are applied to the vehicle 102 associated with vehicle body roll. Additionally or alternatively, in some examples, the driving event includes the vehicle 102 driving off-road and/or traveling on a certain surface (e.g., a road or ground surface) 111 that is substantially irregular.

Each of the vehicle stabilizer bars 104, 106 of FIG. 1A may form part of a vehicle suspension and can be implemented, for example, using an active stabilizer bar and the like. In particular, each of the stabilizer bar(s) 104, 106 has a characteristic (e.g., stiffness) that is adjustable via applying a certain electrical input to the stabilizer bar or a clutch mechanism thereof (e.g., see the clutch mechanism 120 of FIG. 1B). In FIG. 1A, the first stabilizer bar 104 and/or the second stabilizer bar 106 can be interposed between a first side 112 of the vehicle and a second side 114 of the vehicle 102 opposite to the first side 112. As a result, the first vehicle stabilizer bar 104 and/or the second vehicle stabilizer bar 106 can twist during the driving event, a degree of which is based substantially on the respective characteristics. As will be discussed further below, each of the vehicle stabilizer bar(s) 104, 106 can be provided with first and second bar members (e.g., see the bar members 122, 124 of FIG. 1B) that can be coupled to part of the vehicle suspension.

To facilitate detections and/or determinations made by the control circuitry 108, the system 100 can include one or more sensors (e.g., vehicle sensors) 116. The sensor(s) 116 of FIG. 1A can be implemented, for example, using one or more steering angle sensors, one or more wheel speed sensors, one or more accelerometers, and the like, any other suitable sensors capable of generating vehicle related data, or a combination thereof. In particular, the sensor(s) 116 is/are configured to generate advantageous data (e.g., raw sensor data and/or processed sensor data) associated with operation of the vehicle 102 and/or the stabilizer bar(s) 104, 106 and provide the data to the control circuitry 108 for processing. In some examples, the sensor(s) 116 generate data indicative of a certain condition associated with the vehicle 102 wherein changing vehicle roll stiffness is advantageous, which enables the control circuitry 108 to determine a particular adjustment for a stabilizer bar 104, 106 associated with changing the roll stiffness of the vehicle 102 and execute the adjustment. Additionally, in some examples (e.g., where the vehicle 102 is an autonomous vehicle), the sensor(s) 116 can include one or more cameras, one or more light detection and ranging (LiDAR) sensors, one or more radio detection and ranging (RADAR) sensors, and the like, any other sensor(s) capable of generating data indicative of an external environment, or a combination thereof.

The control circuitry 108 of FIG. 1A can be implemented, for example, using one or more microcontrollers, one or more ECUs, and the like, any other suitable computing device(s), or a combination thereof. In FIG. 1A, the control circuitry 108 is operatively coupled (e.g., via a vehicle communication bus) to the vehicle 102 or one or more systems thereof, the first stabilizer bar 104, the second stabilizer bar 106, and/or the sensors 116. In particular, the control circuitry 108 of FIG. 1 can be configured to initiate one or more stabilizer bar control processes during which the control circuitry 108 is configured to adjust (a) the characteristic of the first stabilizer bar 104 and/or the (b) the characteristic of the second stabilizer bar 106, as discussed further below. In some examples, the control circuitry 108 can process sensor data received from the sensor(s) 116 to provide such an adjustment for a vehicle stabilizer bar 104, 106. Further, the control circuitry 108 can be configured to detect the condition associated with the vehicle 102 via the sensor(s) 116 and, in response to the detection, initiate the stabilizer bar control processes.

Figure 1B:
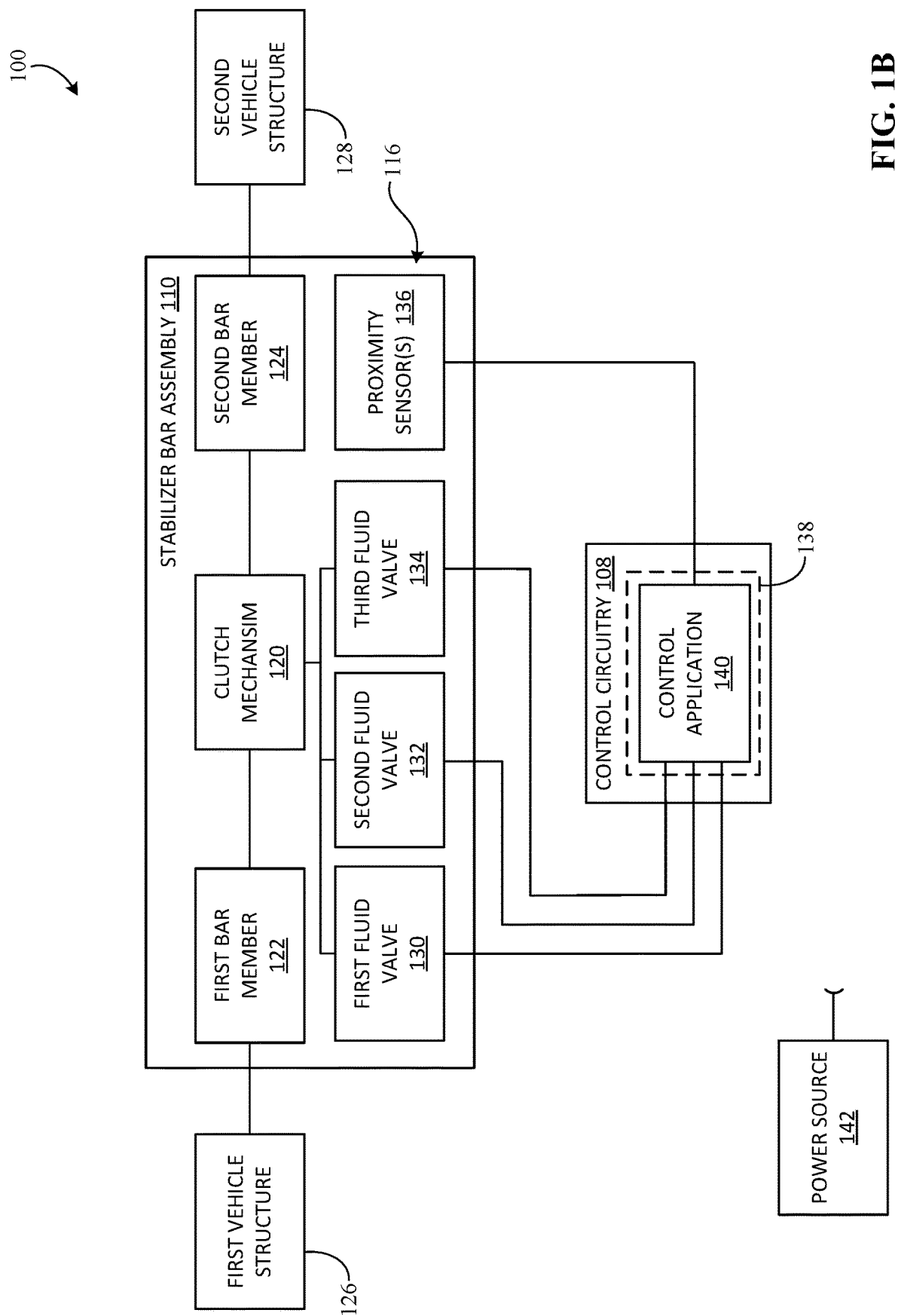
FIG. 1B illustrates another schematic diagram of the stabilizer bar disconnect system of FIG. 1A and shows a stabilizer bar assembly including a clutch mechanism in accordance with the teachings of this disclosure.

FIG. 1B illustrates another schematic diagram of the stabilizer bar disconnect system 100 of FIG. 1A and shows an exemplary stabilizer bar assembly 110 including a clutch mechanism (e.g., a fluidic clutch) 120 in accordance with the teachings of this disclosure. The stabilizer bar assembly 110 of FIG. 1B, when assembled, forms and/or defines a vehicle stabilizer bar 104, 106 or at least part thereof. In FIG. 1B, the stabilizer bar assembly 110 is provided with the clutch mechanism 120, a first bar member 122 of a stabilizer bar, and a second bar member 124 of the stabilizer bar. The first bar member 122 is connected to and/or configured to connect to a first vehicle structure 126 corresponding to the first side 112 of the vehicle 102. The first vehicle structure 126 of FIG. 1B can include a vehicle suspension component such as, for example, a control arm of the vehicle 102. On the other hand, the second bar member 124 is connected to and/or configured to connect to second vehicle structure 128, different from the first vehicle structure 126, corresponding to the second side 114 of the vehicle 102. The second vehicle structure 128 of FIG. 1B can include a different vehicle suspension component such as, for example, a different control arm of the vehicle 102. Accordingly, the first and second vehicle structures 126, 128 can provide support to the stabilizer bar assembly 110 and, in some examples, carry the stabilizer bar assembly 110.

During the driving event previously described, the first vehicle structure 126 and the second vehicle structure 128, together, can urge the first and second bar members 122, 124 to twist. In some examples, the first vehicle structure 126 imparts a load on the first bar member 122 that creates or generates an input torque (e.g., see the torque 232 of FIG. 2A) for the clutch mechanism 120, for example, when the vehicle 102 performing a left-hand turn. Additionally or alternatively, in some examples, the second vehicle structure 128 imparts a load on the second bar member 124 that creates or generates an additional input torque for the clutch mechanism 120, for example, when the vehicle 102 is performing a right-hand turn. In particular, the roll stiffness of the vehicle 102 is substantially defined by a mechanical connection between the first and second bar members 122, 124. For example, the roll stiffness of the vehicle 102 is relatively high when the first bar member 122 is coupled or connected to the second bar member 124, where the input torque can transfer from one of the bar members 122, 124 to the other one of the bar members 122, 124. Conversely, in another example, the roll stiffness of the vehicle 102 is relatively low when the first bar member 122 is decoupled or disconnected from the second bar member 124, where the input torque cannot transfer from one of the bar members 122, 124 to the other one of the bar members 122, 124. Accordingly, to effectively control the roll stiffness of the vehicle 102, the clutch mechanism 120 is configured to control torque transferred between the first and second bar members 122, 124 during the driving event, as will be discussed in greater detail below.

In FIG. 1B, the clutch mechanism 120 facilitates providing an advantageous connection between the first and second bar members 122, 124 (e.g., temporarily or for a time interval). The clutch mechanism 120 of FIG. 1B is configured to operatively couple the first bar member 122 to the second bar member 124. As shown in FIG. 1B, the clutch mechanism 120 of FIG. 1B can be interposed between the first and second bar members 122, 124. In particular, the clutch mechanism 120 is configured to have different states and/or is changeable between the different states, each of which is associated with a different operating characteristic of the clutch mechanism 120. In some examples, the clutch mechanism 120 is configured to have a first state (e.g., a connected state) in which the clutch mechanism 120 substantially couples or connects the first bar member 122 to the second bar member 124 such that a first input torque (e.g., a relatively high torque) is transferrable between the first and second bar members 122, 124 via the clutch mechanism 120. Conversely, in such examples, the clutch mechanism 120 is configured to have a second state (e.g., a disconnected state) in which the clutch mechanism 120 substantially decouples or disconnects the first bar member 122 from the second bar member 124 such that substantially no input torque is transferrable between the first and second bar members 122, 124 via the clutch mechanism 120. Further, the clutch mechanism 120 can be configured to have one or more different states in addition or alternatively to the first and second states. For example, when in an intermediate state (e.g., a partially connected or disconnected state), the clutch mechanism 120 is configured to partially couple or connect the first bar member 122 to the second bar member 124 such that a second input torque (e.g., a relatively low torque), less than the first input torque, is transferrable between the first and second bar members 122, 124 via the clutch mechanism 120.

To facilitate providing the different states of the clutch mechanism 120 and/or transitioning the clutch mechanism 120 between the different states, one or more fluid valves are provided as part of the clutch mechanism 120, the stabilizer bar assembly 110, and/or, more generally, the stabilizer bar disconnect system 100. For example, a first fluid valve 130, a second fluid valve 132, and a third fluid valve 134 are operatively coupled to the clutch mechanism 120 or part thereof (e.g., a housing), which facilitate controlling one or more parameters of a working fluid in the clutch mechanism 120 in connection with changing the state of the clutch mechanism 120 and/or maintaining the state of the clutch mechanism 120. In particular, the state of the clutch mechanism 120 is based on valve positions of the respective fluid valves 130, 132, 134, as discussed in greater detail below. Accordingly, in some examples, the clutch mechanism 120 is configured to couple the first bar member 122 to the second bar member 124 or decouple the first bar member 122 from the second bar member 124 based on the valve positions of the respective fluid valves 130, 132, 134.

The fluid valves 130, 132, 134 of FIG. 1B can be implemented, for example, using one or more solenoid valves and the like, any other suitable fluid valve(s), or a combination thereof. The fluid valve(s) 130, 132, 134 may be configured to have functionality corresponding to any of on/off flow control and/or variable flow control. In any case, each of the fluid valve(s) 130, 132, 134 may be provided with a valve actuator (e.g., a solenoid, an electric motor, and the like) responsive to electrical input from the control circuitry 108. For example, the control circuitry 108 can control a valve actuator of a fluid valve 130, 132, 134 to (a) open the fluid valve 130, 132, 134, (b) close the fluid valve 130, 132, 134, or (c) change the fluid valve 130, 132, 134 from a first valve position (e.g., an open position) to a second valve position (e.g., a closed position or an intermediate position between the open and closed positions) different from the first valve position. As such, the control circuitry 108 can particularly operate one or more of the fluid valves 130, 132, 134 to change the state of the clutch mechanism 120.

The sensor(s) 116 previously described in connection with FIG. 1A can be provided as part of the clutch mechanism 120 and/or the stabilizer bar assembly 110. In some examples, the sensor(s) 116 include one or more proximity sensors 136 configured to generate positional data associated with the first bar member 122 and/or the second bar member 124. In such examples, the proximity sensor(s) 136 can generate data indicative of a position (e.g., an angular position) corresponding to a fluid control member (e.g., a paddle) attached to the first or second bar member 122, 124. The proximity sensor(s) 136 of FIG. 1B can be implemented, for example, using one or more ultrasonic proximity sensors, one or more magnetic proximity sensors, one or more inductive proximity sensors, one or more optical proximity sensors, and the like, or a combination thereof.

In some examples, to facilitate providing automatic functions of the clutch mechanism 120, the control circuitry 108 of FIG. 1B is provided with a primary processor 138. In FIG. 1B, the primary processor 138 includes a control application 140 (e.g., installed on the primary processor 138), which provides instantaneous or near instantaneous control of the fluid valve(s) 130, 132, 134 based on the above-described sensor data generated by the sensor(s) 116, 136. In some examples (e.g., to initiate the stabilizer bar control processes), the primary processor 138 of FIG. 1B is configured to execute the control application 140 while the vehicle 102 is on and/or driving, thereby transmitting (e.g., repeatedly or continuously) control signals or commands and/or electrical power to the fluid valve(s) 130, 132, 134. In such examples, one or more desired ones of the fluid valve(s) 130, 132, 134 open, close, and/or change position in response to receiving the control signal(s) or command(s) and/or the electrical power from the control circuitry 108. In particular, during execution of the control application 140, a valve position of each fluid valve 130, 132, 134 can be controlled by the control circuitry 108 (e.g., in real time) via the commands and/or the electrical power.

Additionally, the system 100 can be provided with an example power source 142, which facilitates powering the control circuitry 108 (including the primary processor 138), the fluid valve(s) 130, 132, 134, and/or the sensor(s) 116, 136. The power source 142 of FIG. 1B can be implemented, for example, using one or more batteries (e.g., a vehicle battery), one or more electrical generators (e.g. a vehicle alternator), and the like, any other suitable power source(s), or a combination thereof. The power source 142 is electrically coupled (e.g., via one or more wires) to any of the control circuitry 108 (including the primary processor 138), the fluid valve(s) 130, 132, 134, and/or the sensor(s) 116, 136. In particular, the power source 142 is configured to supply or provide electrical power to at least some or all of such components.

Figure 2A:
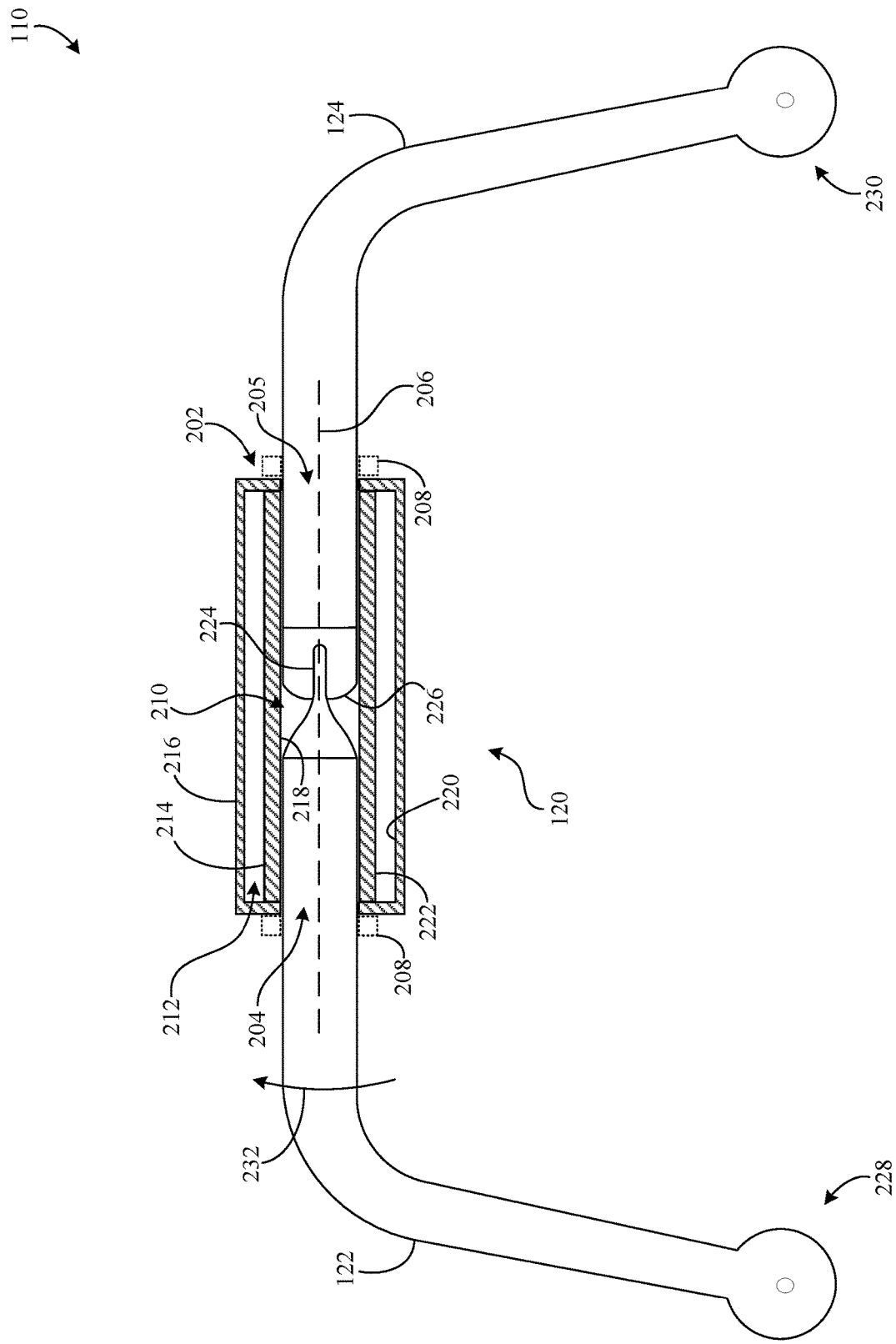
FIG. 2A is a detailed view of the stabilizer bar assembly of FIG. 1B and shows the clutch mechanism operatively interposed between first and second bar members.

FIG. 2A is a detailed view of the stabilizer bar assembly 110 and shows the clutch mechanism 120 operatively interposed between the first and second bar members 122, 124. Each of the bar members 122, 124 of FIG. 2A can be implemented, for example, using one or more bars, one or more tubes, and the like, any other suitably-shaped solid body, or a combination thereof. According to the illustrated example of FIG. 2A, the clutch mechanism 120 of FIG. 2A includes a housing 202 configured to receive the first and second bar members 122, 124, a cross-section of which is shown, for clarity. For example, during assembly, the first bar member 122 can be inserted in a first aperture 204 that is positioned on a first end of the housing 202, and the second bar member 124 can be inserted in a second aperture 205 that is positioned on a second end of the housing 202 opposite to the first end. Accordingly, the housing 202 can be interposed between the first and second bar members 122, 124. As shown in FIG. 2A, the first and second bar members 122, 124 extend through the housing 202 along an axis 206 of the housing 202. The axis 206 can be a longitudinal axis of the housing 202 and may correspond to an axis of rotation. In particular, the housing 202 of FIG. 2A is rotatably coupled to the first and second bar members 122, 124 such that the first bar member 122 and/or the second bar member 124 can rotate relative to the housing 202 about the axis 206.

In some examples, to facilitate relative movement of the bar member(s) 122, 124, the stabilizer bar assembly 110 can be provided with one or more bearings (e.g., any of ball bearings, roller bearings, and the like) 208, as represented by the dotted/dashed lines of FIG. 2A. For example, at least one of the bearings 208 can be operatively coupled to the housing 202 and the first bar member 122, and at least another one of the bearings 208 can be operatively coupled to the housing 202 and the second bar member 124. As such, the first and second bar members 122, 124 can rotate independent of each other or cooperatively together (i.e., in tandem), depending the state of the clutch mechanism 120.

While FIG. 2A depicts the two example bearings 208 that are external to the housing 202, in some examples, the stabilizer bar assembly 110 is implemented differently. For example, at least one or both of the bearings 208 shown in FIG. 2A may be positioned internal to the housing 202. Further, one or more other bearings can be similarly utilized in addition or alternatively to the two bearings 208 shown in FIG. 2A.

In FIG. 2A, the housing 202 is rotatably supported by the first and second bar members 122, 124 and free from the rest of the vehicle 102. As such, the housing 202 of FIG. 2A is permitted to tilt and/or bend with the first and second bar members 122, 124 when the driving event occurs.

Figure 2B:
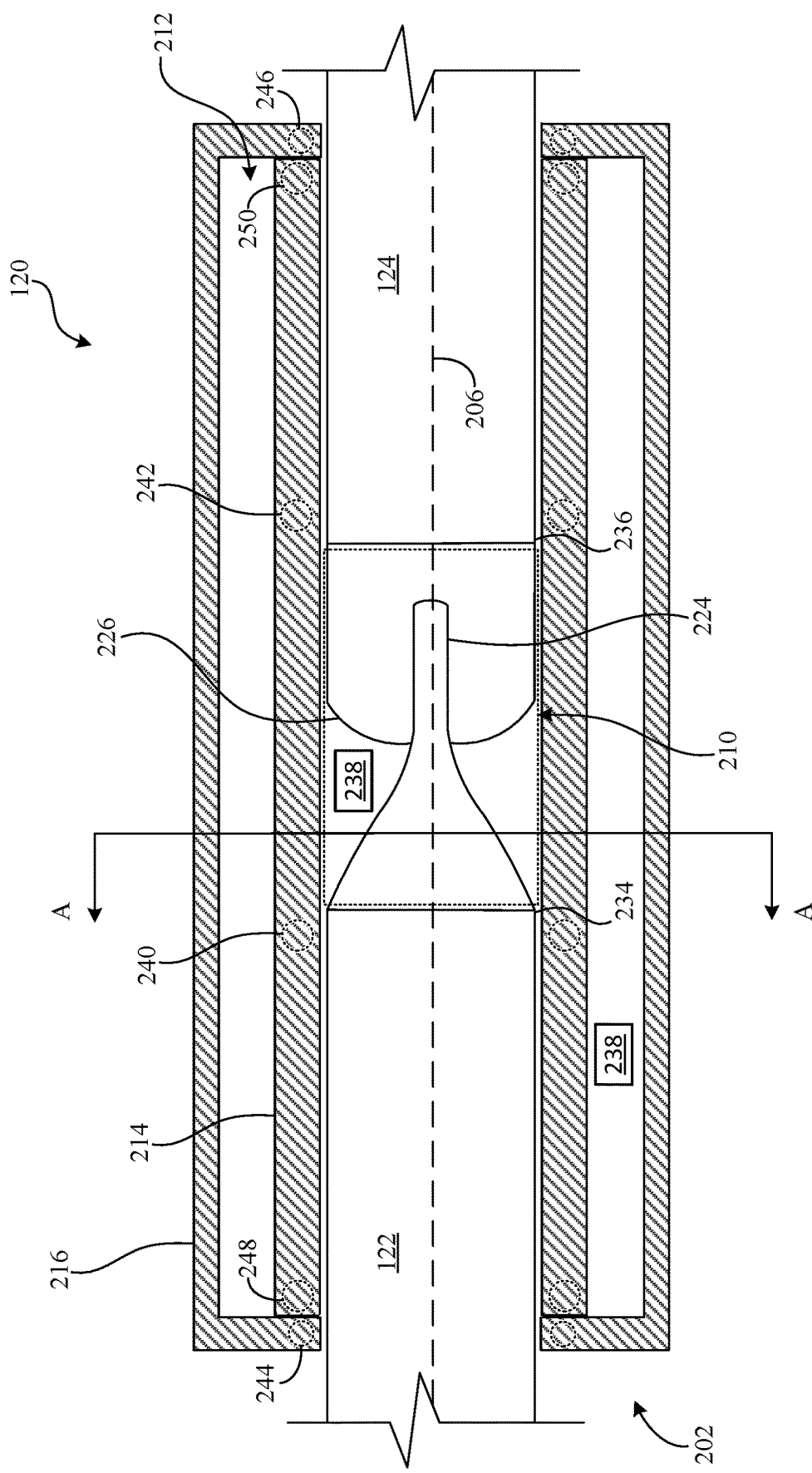
FIG. 2B is an enlarged partial-view of the clutch mechanism of FIG. 2A.

The clutch mechanism 120 of FIG. 2A includes a primary fluid chamber (e.g., a hydraulic fluid chamber) 210 in the housing 202 to receive a fluid (e.g., see the fluid 238 of FIG. 2B). The clutch mechanism 120 of FIG. 2A also includes a secondary fluid chamber (e.g., a fluid reservoir) 212 external to the primary fluid chamber 210, which helps create one or more advantageous fluid paths between different areas of the primary fluid chamber 210 along which the fluid can flow. The secondary fluid chamber 212 is in fluid communication with the primary fluid chamber 210 such that the fluid is conveyable from the primary fluid chamber 210 to the secondary fluid chamber 212 and/or vice versa. The secondary fluid chamber 212 can be implemented, for example, using a tank and the like, any other suitable container(s) capable of holding fluid, or a combination thereof. Additionally or alternatively, in some examples, the secondary fluid chamber 212 is implemented using the housing 202 or at least a portion thereof.

In some examples, the housing 202 includes a first housing portion (e.g., an inner portion) 214 and a second housing portion (e.g., an outer portion) 216 different from the first housing portion 214. In such examples, the first housing portion 214 forms and/or defines the primary fluid chamber 210, for example, together with an end of the first bar member 122 and/or an end of the second bar member 124. As shown in FIG. 2B, an inner surface (e.g., an inner circumferential surface) 218 on the first housing portion 214 is adjacent or proximate to the first and second bar members 122, 124 and can be continuous around the axis 206. Additionally or alternatively, in such examples, the second housing portion 216 forms and/or defines the secondary fluid chamber 212, for example, together with the first housing portion 214. As shown in FIG. 2A, an inner surface (e.g., an inner circumferential surface) 220 on the second housing portion 216 is spaced from an outer surface (e.g., an outer circumferential surface) 222 on the first housing portion 214. The inner surface 220 on the second housing portion 216 and the outer surface 222 on the first housing portion 214 may be continuous around the axis 206 such that the secondary fluid chamber 212 substantially surrounds the first housing portion 214. In some examples, the secondary fluid chamber 212 is substantially annular.

While FIG. 2A depicts the two housing portions 214, 216, in some examples, the housing 202 is implemented differently, for example, using only the first housing portion 214.

In some examples, the first housing portion 214 of FIG. 2B is cylindrically-shaped and is sometimes referred to as a first cylindrically-shaped portion. Similarly, in some examples, the second housing portion 216 of FIG. 2B is also cylindrically-shaped and sometimes referred to as a second cylindrically-shaped portion. In such examples, the first housing portion 214 is internal to the second housing portion 216, as shown in FIG. 2B, which substantially reduces packaging size and/or part complexity of the clutch mechanism 120. However, in other examples, the first housing portion 214 and/or the second housing portion 216 may be sized, shaped, and/or otherwise implemented differently while still sufficiently maintaining associated functionality. According to the illustrated example of FIG. 2B, the first housing portion 214 is coupled (e.g., rotatably coupled) to the second housing portion 214. In some examples, the first housing portion 214 can rotate freely about the axis 216 relative to the first bar member 122, the second bar member 124, and/or the second housing portion 216 when the clutch mechanism 120 is in operation.

To facilitate transferring energy via the fluid in the primary fluid chamber 210, the clutch mechanism 120 includes one or more fluid control members 224, 226, two of which are shown in this example. That is, the clutch mechanism 120 of FIG. 2A includes a first fluid control member (e.g., a paddle) 224 and a second fluid control member (e.g., a paddle) 226. The first and second fluid control members 224, 226 are connected to respective ones of the first and second bar members 122, 124. In some examples, the first fluid control member 224 is fixedly coupled to the first bar member 122, for example, via one or more fasteners and/or one or more fastening methods or techniques. Similarly, in some examples, the second fluid control member 226 is fixedly coupled to the second bar member 124, for example, via one or more fasteners and/or one or more fastening methods or techniques. As shown in FIG. 2A, the first and second fluid control members 224, 226 are disposed in the primary fluid chamber 210 and extend through the primary fluid chamber 210 or at least part thereof along the axis 206, which creates different sections of the primary fluid chamber 210 that can be substantially sealed off from each other (e.g., see the three different sections 308, 310, 312 shown in FIGS. 3A, 3B, and 3C). The first fluid control member 224 can axially extend away from the first bar member 122 toward or to the second bar member 124, while the second fluid control member 226 can axially extend away from the second bar member 124 toward or to the first bar member 122.

In FIG. 2A, a first end (e.g., a distal end) 228 of the first bar member 122 can be configured to receive and/or couple to the first vehicle structure 126. Similarly, a first end (e.g., a distal end) 230 of the second bar member 124 can be configured to receive and/or couple to the second vehicle structure 128. As previously mentioned, the clutch mechanism 120 can control torque transferred between the first and second bar members 122, 124 during the driving event to control the roll stiffness of the vehicle 102. In some examples, in response to the first bar member 122 applying an input torque 232 to the clutch mechanism 120, the clutch mechanism 120 is configured to transfer the input torque 232 or at least a portion thereof from the first bar member 122 to the second bar member 124. As a result, in such examples, the clutch mechanism 120 effectively increases the roll stiffness of the vehicle 102, which can improve vehicle stability and/or steering response. On the other hand, in some examples, the clutch mechanism 120 is configured to cease transferring the input torque 232 from the first bar member 122 to the second bar member 124. As a result, in such examples, the clutch mechanism 120 effectively decreases the roll stiffness of the vehicle 102, which can improve vehicle ride quality and/or steering feel. Of course, such an input torque 232 can be similarly provided to the clutch mechanism 120 by the second bar member 124 and transferred, via the clutch mechanism 120, to the first bar member 122.

FIG. 2B is an enlarged partial-view of the clutch mechanism 120 of FIG. 2A. In FIG. 2B, the first fluid control member 224 is positioned at or adjacent a second end (e.g., a proximal end) 234 of the first bar member 122, and the second fluid control member 224 is positioned at or adjacent a second end (e.g., a proximal end) 236 of the second bar member 124 that may face the second end 234 of the first bar member 122. Further, an example fluid 238 is disposed in the primary and secondary fluid chambers 210, 212. As previously described, each of the first and second bar members 122, 124 can rotate relative to the housing 202 about the axis 206. Consequently, each of the first and second fluid control members 224, 226 can rotate relative to the housing 202 about the axis 206. Such relative rotation of the first or second fluid control member 224, 226 changes one or more parameters (e.g., any of a fluid pressure, a flow rate, and the like) of the fluid 238 or a portion thereof that is in the primary fluid chamber 210, which can enable the fluid 238 to transmit energy from one of the fluid control members 224, 226 to the other one of the fluid control members 224, 226.

The fluid 238 of FIG. 2B can be implemented, for example, using a damping fluid that is incompressible such as oil and the like. Accordingly, the fluid 238 of FIG. 2A is sometimes referred to as a damping fluid. Additionally or alternatively, in some examples, the fluid 238 can include one or more fluids responsive to an electric current such as, for example, an MR fluid. Utilizing such a fluid can improve clutch performance when the clutch mechanism 120 is in the first state thereof, as discussed further below.

The primary fluid chamber 210 is substantially represented by the dotted/dashed lines of FIG. 2B. According to the illustrated example of FIG. 2B, the primary fluid chamber 210 is sealed off (e.g., hermetically sealed off) with respect to an external environment. As a result, the fluid 238 cannot flow from the primary fluid chamber 210 to the external environment (i.e., leak out of the primary fluid chamber 210), and/or an external fluid (e.g., air) cannot flow into the primary fluid chamber 210 from the external environment (i.e., leak into the primary fluid chamber 210). Additionally, the secondary fluid chamber 210 can also be similarly sealed off with respect to the external environment.

To achieve such sealing, the clutch mechanism 120 can be provided with one or more housing fluid seals (e.g., mechanical seals) 240, 242, 244, 246, 248, 250 which are represented by the dotted/dashed lines of FIG. 2B. The housing fluid seal(s) 240, 242, 244, 246, 248, 250 can be implemented, for example, using one or more gaskets (e.g., rings such as O-rings) and the like, any other suitable sealing element(s), or a combination thereof. In some examples, a first housing fluid seal 240 can be operatively interposed between the first housing portion 214 and the first bar member 122, as shown in FIG. 2B. In such examples, the first housing fluid seal 240 is configured to sealingly engage the first housing portion 214 and the first bar member 122, thereby preventing fluid from flowing across or past the first housing fluid seal 240. Additionally or alternatively, in some examples, a second housing fluid seal 242 can be operatively interposed between the first housing portion 214 and the second bar member 124, as shown in FIG. 2B. In such examples, the second housing fluid seal 242 is configured to sealingly engage the first housing portion 214 and the second bar member 124, thereby preventing fluid from flowing across or past the second housing fluid seal 242. To facilitate carrying the first and second housing fluid seal(s) 240, 242, the first housing portion 214 may be provided with one or more seal grooves (e.g., circumferential grooves), each of which can be sized and/or shaped to receive a respective one of the housing fluid seal(s) 240, 242.

Additionally, to improve sealing quality, a third housing fluid seal 244 can be operatively interposed between the second housing portion 216 and the first bar member 122, and/or a fourth housing fluid seal 246 can be operatively interposed between the second housing portion 216 and the second bar member 124. As shown in FIG. 2B, the third housing fluid seal 244 can be positioned on the second housing portion 216 at or adjacent an end thereof, while the fourth housing fluid seal 246 can be positioned on the second housing portion 216 at or adjacent an opposite end thereof. In some examples, similar to the first housing portion 214, the second housing portion 216 may be provided with one more seal grooves (e.g., circumferential grooves), each of which can be sized and/or shaped to receive a respective one of the housing fluid seals 244, 246.

Further, in some examples, to facilitate sealing off the secondary fluid chamber 212, fifth and sixth housing fluid seals 248, 250 can be operatively interposed between the first and second housing portions 214, 216, where each housing fluid seal 248, 250 is positioned at or adjacent an end (e.g., a cylinder end) of the first housing portion 214. In such examples, the first or second housing portion 214 may be provided with one or more seal grooves (e.g., annular grooves) configured to receive respective ones of the housing fluid seals 248, 250.

While FIG. 2B depicts the six housing fluid seals 240, 242, 244, 246, 248, 250, in some examples, the clutch mechanism 120 is implemented differently, for example, using one or more additional or fewer fluid seals.

FIG. 3A is a cross-sectional view of the clutch mechanism 120 taken along lines A-A of FIG. 2B and shows an implementation of the clutch mechanism 120. According to the illustrated example of FIG. 3A, the first and second fluid control members 224, 226 are disposed in the primary fluid chamber 210 and can rotate relative to the housing 202 about the axis 206. For example, the first fluid control member 224 is rotatable in a first rotational direction (e.g., clockwise) 302 and/or a second rotational direction (e.g., counterclockwise) 304 opposite to the first rotational direction 302, for example, when the input torque 232 is applied to the clutch mechanism 120. Similarly, the second fluid control member 226 is rotatable in the first rotational direction 302 and/or the second rotational direction 304.

In FIG. 3A, the primary fluid chamber 210 is provided with different sections separated by the fluid control members 224, 226 and an example wall 306 in the primary fluid chamber 210, which facilitates creating certain pressure gradients across the respective fluid control member 224, 226. For example, the first fluid control member 224 and the wall 306, together, can partially define a first section 308 of the primary fluid chamber 210. Further, the second fluid control member 226 and the wall 306, together, can partially define a second section 310 of the primary fluid chamber 210 adjacent the first section 308. Further still, the first and second fluid control members 224, 224, together, can partially define a third section 312 of the primary fluid chamber 210 between the first and second sections 308, 310. As shown in FIG. 3A, the sections 308, 310, 312 of the primary fluid chamber 210 are separated from each other and/or radially distributed relative to the axis 206.

The fluid valve(s) 130, 132, 134 previously described can be installed in the clutch mechanism 120 of FIG. 3A and advantageously used to control a flow of the fluid 238 between the primary fluid chamber 210 and the secondary fluid chamber 212. As shown in FIG. 3A, the first fluid valve 130 is fluidly interposed between the first section 308 of the primary fluid chamber 210 and the secondary fluid chamber 212. The first fluid valve 130 can be positioned on the first housing portion 214 angularly spaced from and/or between the first fluid control member 224 and the wall 306. In some examples, the first fluid valve 130 is coupled to the first housing portion 214, for example, via one or more fasteners and/or one or more fastening methods or techniques. In particular, during clutch operation, the first fluid valve 130 of FIG. 3A is configured to control a flow of the fluid 238 between the first section 308 of the primary fluid chamber 210 and the secondary fluid chamber 212 based on a valve positon of the first fluid valve 130. Accordingly, the first fluid valve 130 can facilitate controlling a fluid pressure in the first section 308 when the clutch mechanism 120 is in operation, for example, cooperatively or together with the third fluid valve 134.

In some examples, when the first fluid valve 130 is open or in a first valve position (e.g., a substantially open position) thereof, the fluid 238 can flow across the first fluid valve 130 from the first section 308 to the secondary fluid chamber 212, for example, while the fluid pressure in the first section 308 is relatively high or greater than a fluid pressure in the secondary fluid chamber 212. In FIG. 3A, the first fluid valve 130 is open or in the first valve positon thereof. Conversely, when the first fluid valve 130 is open or in the first valve position there, the fluid 238 can flow across the first fluid valve 130 from the secondary fluid chamber 212 to the first section 308, for example, while the fluid pressure in the secondary fluid chamber 212 is relatively high or greater than the fluid pressure in the first section 308. On the other hand, when the first fluid valve 130 is closed or in a second valve position (e.g., a substantially closed position) thereof different from the first valve position, the fluid 238 is prevented from flowing across the first fluid valve 130 (e.g., see FIG. 3B).

Further, the second fluid valve 132 of FIG. 3A is fluidly interposed between the second section 310 of the primary fluid chamber 210 and the secondary fluid chamber 212. The second fluid valve 132 can be positioned on the first housing portion 214 angularly spaced from and/or between the second fluid control member 226 and the wall 306. In some examples, the second fluid valve 132 is coupled to the first housing portion 214, for example, via one or more fasteners and/or one or more fastening methods or techniques. In particular, during clutch operation, the second fluid valve 132 of FIG. 3A is configured to control a flow of the fluid 238 between the second section 310 of the primary fluid chamber 210 and the secondary fluid chamber 212 based on a valve positon of the second fluid valve 132. Accordingly, the second fluid valve 132 can facilitate controlling a fluid pressure in the second section 310 when the clutch mechanism 120 is in operation, for example, cooperatively or together with the third fluid valve 134.

In some examples, when the second fluid valve 132 is open or in a first valve position (e.g., a substantially open position) thereof, the fluid 238 can flow across the second fluid valve 132 from the second section 310 to the secondary fluid chamber 212, for example, while the fluid pressure in the second section 310 is relatively high or greater than the fluid pressure in the secondary fluid chamber 212. In FIG. 3A, the second fluid valve 132 is open or in the first valve position thereof. Conversely, when the second fluid valve 132 is open or in the first valve position there, the fluid 238 can flow across the second fluid valve 132 from the secondary fluid chamber 212 to the second section 310, for example, while the fluid pressure in the secondary fluid chamber 212 is relatively high or greater than the fluid pressure in the second section 310. On the other hand, when the second fluid valve 132 is closed or in a second valve position (e.g., a substantially closed position) thereof different from the first valve position, the fluid 238 is prevented from flowing across the second fluid valve 132 (e.g., see FIG. 3B).

Further still, the third fluid valve 134 of FIG. 3A is fluidly interposed between the first and second sections 308, 310 of the primary fluid chamber 210. The third fluid valve 134 can be positioned on the wall 306 and coupled to the wall 306, for example, via one or more fasteners and/or one or more fastening methods or techniques. In particular during clutch operation, the third fluid valve 134 of FIG. 3A is configured to control a flow of the fluid 238 between the first and second sections 308, 310 of the primary fluid chamber 210 based on a valve positon of the third fluid valve 134.

In some examples, when the third fluid valve 134 is open or in a first valve position (e.g., a substantially open position) thereof, the fluid 238 can flow across the third fluid valve 134 from the first section 308 to the second section 310 while the fluid pressure in the first section 308 is relatively high or greater than the fluid pressure in the second section 310. Conversely, when the third fluid valve 134 is open or in the first valve position thereof, the fluid 238 can flow across the third fluid valve 134 from the second section 310 to the first section 308 while the fluid pressure in the second section 310 is relatively high or greater than the fluid pressure in the first section 308. On the other hand, when the third fluid valve 134 is closed or in a second valve position thereof (e.g., a substantially closed position) different from the first valve position, the fluid 238 is prevented from flowing across the third fluid valve 134 (e.g., see FIG. 3C)

To facilitate independent rotation of the fluid control members 224, 226 (e.g., when the clutch mechanism 120 is in the second state or the intermediate state), the clutch mechanism 120 can be provided with an orifice 314 positioned on the housing 202 or the first housing portion 214. As shown in FIG. 3A, the orifice 314 extends entirely through the first housing portion 214 radially outward relative to the axis 206 from the third section 312 to the secondary fluid chamber 212. In particular, the orifice 314 of FIG. 3A fluidly couples the primary fluid chamber 210 or a certain section thereof to the secondary fluid chamber 212. In some examples, the orifice 314 can be fluidly interposed between the third section 312 of the fluid chamber 210 and the secondary fluid chamber 212, as shown in FIG. 3A. Accordingly, the fluid 238 can flow freely through the orifice 314 between the third section 312 of the primary fluid chamber 210 and the secondary fluid chamber 212 during operation of the clutch mechanism 120.

In some examples, the clutch mechanism 120 includes a spool 316 centrally positioned in the primary fluid chamber 210, which facilitates sealing off the different sections 308, 310, 312 of the primary fluid chamber 210 and/or providing guidance to the fluid control member(s) 224, 226. In particular, each of the first and second fluid control members 224, 226 is interposed between an outer surface 318 on the spool 316 and the inner surface 218 on the first housing portion 214. In such examples, an inner radial portion 322 of the first fluid control member 224 is proximate to the outer surface 318 on the spool 316, while an outer radial portion 324 of the first fluid control member 224 is proximate to the inner surface 218 on the first housing portion 214. The inner radial portion 322 of the first fluid control member 224 can include an area that is positioned at or adjacent an inner radial side of the first fluid control member 224 arranged alongside and/or facing the spool 316. On the other hand, the outer radial portion 324 of the first fluid control member 224 can include an area that is positioned at or adjacent an outer radial side of the first fluid control member 224 arranged alongside and/or facing the first housing portion 214.

Additionally, in FIG. 3A, an inner radial portion 326 of the second fluid control member 226 is proximate to the outer surface 318 on the spool 316, while an outer radial portion 328 of the second fluid control member 226 is proximate to the inner surface 218 of the housing 202. The inner radial portion 326 of the second fluid control member 226 can include an area that is positioned at or adjacent an inner radial side of the second fluid control member 226 arranged alongside and/or facing the spool 316. On the other hand, the outer radial portion 328 of the second fluid control member 226 can include an area that is at or adjacent an outer radial side of the second fluid control member 226 arranged alongside and/or facing the first housing portion 214.

The wall 306 can be advantageously utilized to secure a position and/or an orientation of the spool 316 relative to the housing 202. In FIG. 3A, the wall 306 is attaching the spool 316 to the housing 202 or the first portion 214 thereof. As shown in FIG. 3A, the wall 306 extends away from the inner surface 218 on the first housing portion 214 radially inward relative to the axis 206 toward the spool 316 to receive the spool 316 at an end of the wall 306. Further, the wall 306 is straight and/or extends through an area of the primary fluid chamber 210 linearly along the axis 206 across a length of the primary fluid chamber 210. In some examples, the wall 306 is coupled to the first housing portion 214 and the spool 316, for example, via one or more fasteners and/or one or more fastening methods or techniques.

In some examples, the spool 316 is cylindrically-shaped. For example, a body of the spool 316 can form and/or define a cylinder (e.g., a solid cylinder or a hollow cylinder). As such, the outer surface 318 on the spool 316 can be circumferential. In such examples, a relatively small gap (e.g., 0.1 inches, 0.01 inches, etc.) may exist between the inner radial portion 322 of the first fluid control member 224 and the spool 316. Similarly, a relatively small gap (e.g., 0.1 inches, 0.01 inches, etc.) may exist between the inner radial portion 326 of the second fluid control member 226 and the spool 316. Alternatively, during clutch operation, the inner radial portion 322 of the first fluid control member 224 may slightly contact the spool 316, and/or the inner radial portion 326 of the second fluid control member 226 may slightly contact the spool 316.

In some examples, the inner radial portion 322 of the first fluid control member 224 can be configured to engage the spool 316 to form a seal or tight closure that extends along a length of the spool 316 or part thereof and substantially prevents the fluid 238 from flowing between the spool 316 and the inner radial portion 322 of the first fluid control member 224. Additionally or alternatively, the inner radial portion 326 of the second fluid control member 226 can be configured to engage the spool 316 to form an additional seal or tight closure that extends along the length of the spool 316 or part thereof and substantially prevents the fluid 238 from flowing between the spool 316 and the inner radial portion 326 of the second fluid control member 226. In such examples, the outer surface 318 on the spool 316 is sometimes referred to as an outer sealing surface.

As previously mentioned, in some examples, the first housing portion 214 is cylindrically-shaped. In FIG. 3A, a body of the first housing portion 214 can form and/or define a cylinder (e.g., a hollow cylinder). As such, the inner surface 218 on the first housing portion 214 can be circumferential. In such examples, a relatively small gap (e.g., 0.1 inches, 0.01 inches, etc.) may exist between the outer radial portion 324 of the first fluid control member 224 and the first housing portion 214. Similarly, a relatively small gap (e.g., 0.1 inches, 0.01 inches, etc.) may exist between the outer radial portion 328 of the second fluid control member 226 and the first housing portion 214. Alternatively, during clutch operation, the outer radial portion 324 of the first fluid control member 224 may slightly contact the first housing portion 214, and/or the outer radial portion 328 of the second fluid control member 226 may slightly contact the first housing portion 214.

In some examples, the outer radial portion 324 of the first fluid control member 224 can be configured to engage the first housing portion 214 to form an additional seal or tight closure that extends along a length of the first housing portion 214 or part thereof and substantially prevents the fluid 238 from flowing between the first housing portion 214 and the outer radial portion 324 of the first fluid control member 224. Additionally or alternatively, the outer radial portion 328 of the second fluid control member 226 can be configured to engage the first housing portion 214 to form an additional seal or tight closure that extends along the length of the first housing portion 214 or part thereof and substantially prevents the fluid 238 from flowing between the first housing portion 214 and the outer radial portion 328 of the second fluid control member 226. In such examples, the inner surface 218 on the first housing portion 214 is sometimes referred to as an inner sealing surface.

Additionally or alternatively, to facilitate sealing off the different sections 308, 310, 312 of the primary fluid chamber 210, the clutch mechanism 120 can be provided with one or more fluid seals (e.g., mechanical seals) 330, 332, 334, 336 operatively coupled to the first fluid control member 224 and/or the second fluid control member 226. In some examples, a first fluid seal 330 is positioned on the first fluid control member 224 at the inner radial portion 322 thereof. In such examples, the first fluid seal 330 is configured to sealingly engage the outer sealing surface 318 and part of the inner radial portion 322 of the first fluid control member 224, thereby preventing the fluid 238 from flowing past the first fluid seal 330 or around the inner radial portion 322 of the first fluid control member 224. Further, in some examples, a second fluid seal 332 is positioned on the first fluid control member 224 at the outer radial portion 324 thereof. In such examples, the second fluid seal 332 is configured to sealingly engage the inner sealing surface 218 and part of the outer radial portion 324 of the first fluid control member 224, thereby preventing the fluid 238 from flowing past the second fluid seal 332 or around the outer radial portion 324 of the first fluid control member 224. In this manner, the first and second fluid seals 330, 332, together, can prevent the fluid 238 from leaking between the first and third sections 308, 312 of the primary fluid chamber 210.

In some examples, similar to the first fluid control member 224, a third fluid seal 334 is positioned on the second fluid control member 226 at the inner radial portion 326 thereof. In such examples, the third fluid seal 334 is configured to sealingly engage the outer sealing surface 318 and part of the inner radial portion 326 of the second fluid control member 226, thereby preventing the fluid 238 from flowing past the third fluid seal 334 or around the inner radial portion 326 of the second fluid control member 226. Further, in some examples, a fourth fluid seal 336 is positioned on the second fluid control member 226 at the outer radial portion 328 thereof. In such examples, the fourth fluid seal 336 is configured to sealingly engage the inner sealing surface 218 and part of the outer radial portion 328 of the second fluid control member 226, thereby preventing the fluid 238 from flowing past the fourth fluid seal 336 or around the outer radial portion 328 of the second fluid control member 226. In this manner, the third and fourth fluid seals 334, 336, together, prevent the fluid 238 from leaking between the second and third sections 310, 312 of the primary fluid chamber 210.

Thus, according to one or more examples disclosed herein, the clutch mechanism 120 includes the fluid seals 330, 332, 334, 336 of FIG. 3A, which are positioned at the inner and outer radial portions 322, 326, 324, 328 of the respective first and second fluid control members 224, 226 to prevent the fluid 238 from leaking between the first, second, and third sections 308, 310, 312 of the primary fluid chamber 210.

Figure 3B:
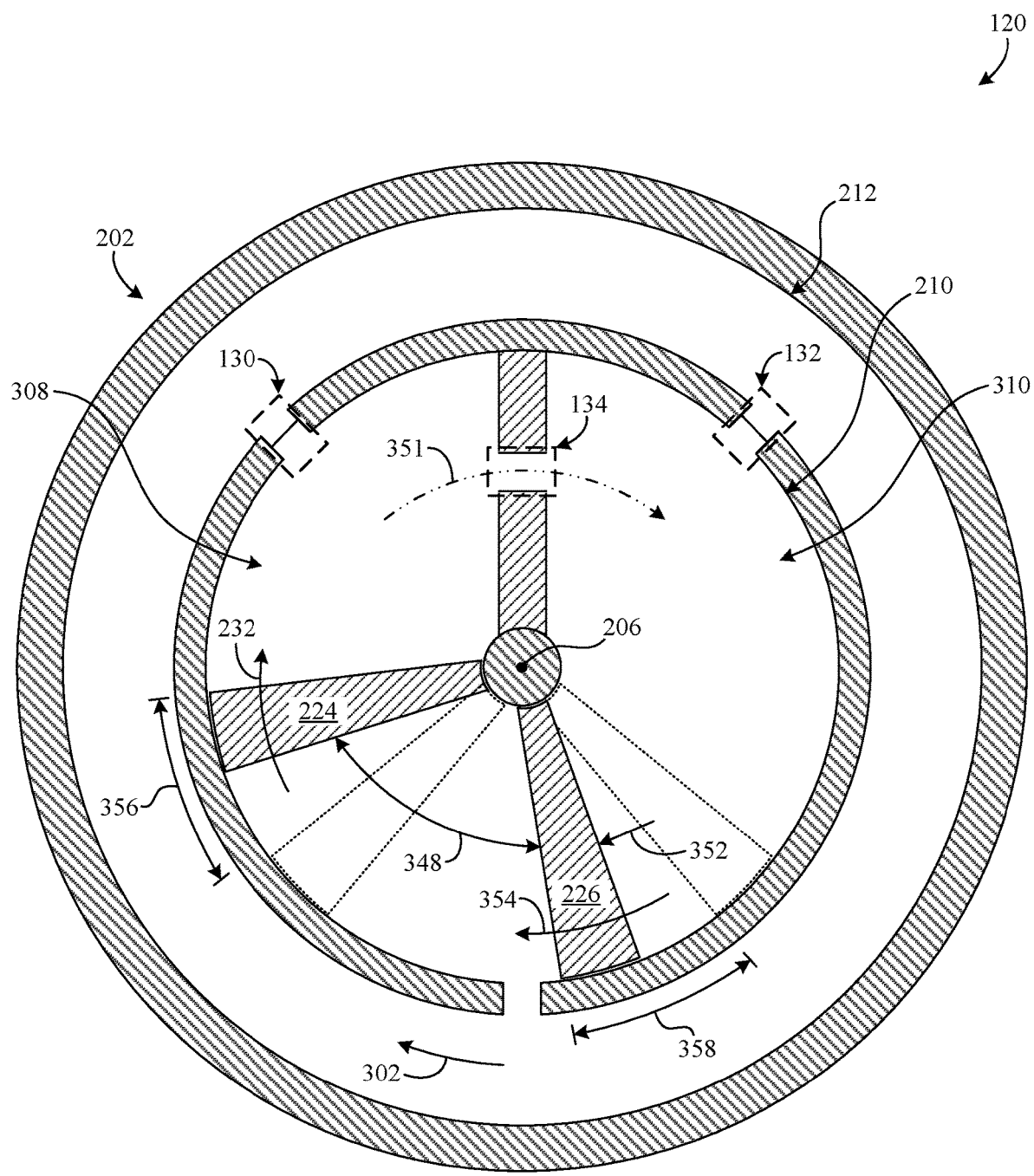
FIGS. 3B and 3C are additional cross-sectional views of the clutch mechanism taken along lines A-A of FIG. 2B and show different example states of the clutch mechanism.
Figure 3C:
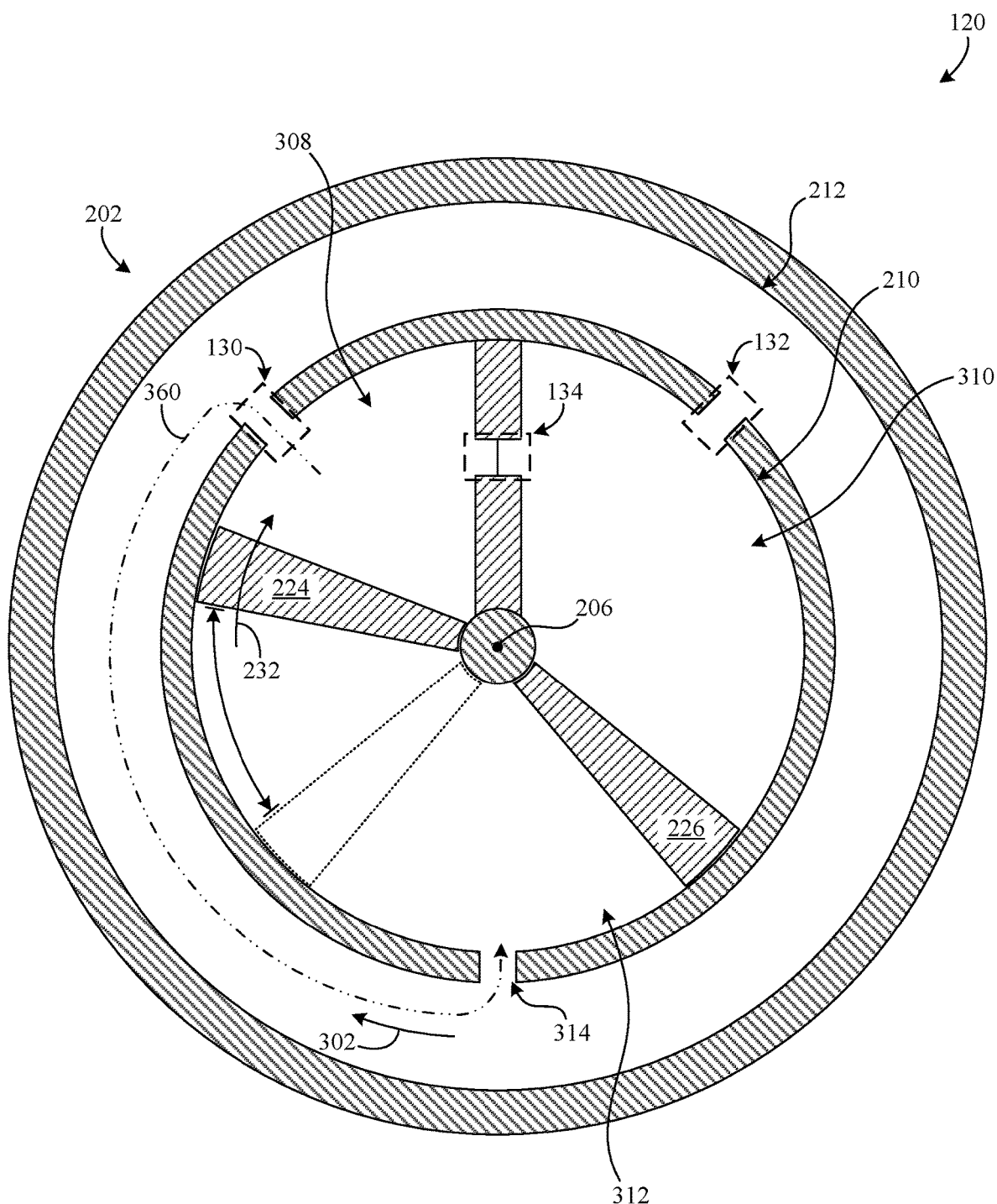

In FIG. 3C, the first fluid control member 224 is arranged substantially across a radius of the primary fluid chamber 210. However, in some examples, the first fluid control member 224 can be expanded, for example, such that the first fluid control member 224 is arranged substantially across a diameter of the primary fluid chamber 210. Further, while FIG. 3C also depicts the second fluid control member 226 arranged substantially across the radius of the primary fluid chamber 210, in some examples, the second fluid control member 226 can be likewise expanded.

Additionally, in some examples, the clutch mechanism 120 includes travel stops 340, 342, 344, 346. The travel stops 340, 342, 344, 346 of FIG. 3A are coupled to the housing 202 or the first portion 214 thereof, for example, via one or more fasteners and/or one or more fastening methods or techniques. Further, the travel stops of FIG. 3A are radially distributed relative to the axis 206. In such examples, the travel stops 340, 342, 344, 346 are configured to limit relative rotation of the first and second fluid control members 224, 226.

In FIG. 3A, a first travel stop 340 can be configured to engage the first fluid control member 224 to limit angular movement of the first fluid control member 224 in the first rotational direction 302. As shown in FIG. 3A, the first travel stop 340 is positioned in the first section 308 of the primary fluid chamber 210 and/or projects from the inner sealing surface 218. The first travel stop 340 of FIG. 3A can be utilized to prevent the first fluid control member 224 from blocking, covering, and/or otherwise interfering with the first fluid valve 130 or functionality thereof. Further, the first travel stop 340 of FIG. 3A can be utilized to prevent the first fluid control member 224 from contacting the wall 306.

Additionally or alternatively, a second travel stop 342 can be configured to engage the first fluid control member 224 to limit angular movement of the first fluid control member 224 in the second rotational direction 304. As shown in FIG. 3A, the second travel stop 342 is positioned in the third section 312 of the primary fluid chamber 210 and/or projects from the inner sealing surface 218. The second travel stop 342 of FIG. 3A can be utilized to prevent the first fluid control member 224 from contacting the second fluid control member 226. Additionally, the first travel stop 340 can be angularly spaced from the second travel stop 342 to provide a desired movement range to the first fluid control member 224.

Additionally or alternatively, a third travel stop 344 can be configured to engage the second fluid control member 226 to limit angular movement of the second fluid control member 226 in the second rotational direction 304. As shown in FIG. 3A, the third travel stop 344 is positioned in the second section 310 of the primary fluid chamber 210 and/or projects from the inner sealing surface 218. The third travel stop 344 of FIG. 3A can be utilized to prevent the second fluid control member 226 from blocking, covering, and/or otherwise interfering with the second fluid valve 132 or functionality thereof. Further, the third travel stop 344 of FIG. 3A can be utilized to prevent the second fluid control member 226 from contacting the wall 306.

Additionally or alternatively, a fourth travel stop 346 can be configured to engage the second fluid control member 226 to limit angular movement of the second fluid control member 226 in the first rotational direction 302. As shown in FIG. 3A, the fourth travel stop 346 is positioned in the third section 312 of the primary fluid chamber 210 and/or projects from the inner sealing surface 218. The fourth travel stop 346 of FIG. 3A can be utilized to prevent the second fluid control member 226 from contacting the first fluid control member 224. Additionally, the third travel stop 344 can be angularly spaced from the fourth travel stop 346 to provide a desired movement range to the second fluid control member 226.

While FIG. 3A depicts the four travel stops 340, 342, 344, 346, in some examples, the clutch mechanism 120 is implemented differently, for example, using one or more additional travel stops, one or more fewer travel stops, and/or one or more different travel stops. In some such examples, the clutch mechanism 120 may be provided with only the second and fourth travel stops 342, 346 to prevent the first and second fluid control members 224, 226 from directly contacting and/or interfering with each other during clutch operation.

According to the illustrated example of FIG. 3A, each of the first and second fluid control members 224, 226 is in an initial position (e.g., an angular position) relative to the housing 202. For example, an initial or first position of the first fluid control member 224 includes a position in which the first fluid control member 224 is angularly spaced from and/or between the first fluid valve 130 and the orifice 314. In another example, an initial first position of the second fluid control member 224 includes a position in which the second fluid control member 226 is angularly spaced from and/or between the second fluid valve 132 and the orifice 314. As shown in FIG. 3A, the first and second fluid control members 224, 226 of FIG. 3A define a certain gap 348, which can be substantially maintained when the clutch mechanism 120 is in the first state thereof.

In some examples, the proximity sensor(s) 136 previously described can be installed in the clutch mechanism 120 of FIG. 3A. For example, a first one of the proximity sensor(s) 136 can be positioned on the first fluid control member 224, as represented by the dotted/dashed lines in FIG. 3A. Further, the first one of the proximity sensor(s) 136 can be coupled to the first fluid control member 224, for example, via one or more fasteners and/or one or more fastening methods or techniques. Additionally or alternatively, at least one of the proximity sensor(s) 136 can be similarly positioned on and/or coupled to the first bar member 122. In another example, a second one of the proximity sensor(s) 136 can be positioned on the second fluid control member 226, as represented by the dotted/dashed lines in FIG. 3A. Further, the second one of the proximity sensor(s) 136 can be coupled to the second fluid control member 226, for example, via one or more fasteners and/or one or more fastening methods or techniques. Additionally or alternatively, at least one of the proximity sensor(s) 136 can be similarly positioned on and/or coupled to the second bar member 124. In particular, in such examples, the control circuitry 108 is configured to detect, via the proximity sensor(s) 136, the gap 348 between the first and second fluid control members 224, 226 and/or a size of the gap 348.

The gap 348 of FIG. 3A can serve as an effective trigger for the control circuitry 108 in connection with adjusting a relative position (e.g., angular position) of the first fluid control member 224 and/or a relative position (e.g., an angular position) of the second fluid control member 224. When the size the of the gap 348 is less than a threshold gap size (e.g., preprogrammed into the control circuitry 108), the first fluid control member 224 may be in a position different from the initial position of the first fluid control member 224, and/or the second fluid control member 226 may be in a position different from the initial position of the second fluid control member 226. In some examples, in response to determining that the size of the gap 348 is less than a threshold gap size, the control circuitry 108 disables the second state of the clutch mechanism 120, for example, until the size of the gap 348 is greater than or equal to the threshold gap size. For example, the control circuitry 108 may set the clutch mechanism 120 in the intermediate state and/or maintain the intermediate state while the size of the gap 348 is less than the threshold gap size, which allows for angular deviation between the first and second fluid control members 224, 226. Additionally or alternatively, in such examples, to quickly reset the fluid control member(s) 224, 226 in a more controlled manner, the control circuitry 108 is configured to selectively open and close one or more of the fluid valves 130, 132, 134 in a manner that urges (a) the first fluid control member 224 to move (e.g., gradually) toward or to the initial position thereof and/or (b) the second fluid control member 226 to move (e.g., gradually) to the initial position thereof.

In some examples, the control circuitry 108 is configured to detect, via the proximity sensor(s) 136, (a) the relative position of the first fluid control member 224 and/or (b) the relative position of the second fluid control member 224. In such examples, the control circuitry 108 can calculate and/or determine, based on the relative positions, a distance by which the first fluid control member 224 is spaced from the second fluid control member 226. Additionally or alternatively, in such examples, based on the relative positions, the control circuitry 108 can proceed to calculate and/or determine an angle 349 by which the first fluid control member 224 is spaced from the second fluid control member 226. The angle 349, which is sometimes referred to as a calculated angle and/or a detected angle, corresponds to the gap 348 between the first and second fluid control members 224, 226. As shown in FIG. 3A, the angle 349 is about 90 degrees. However, in some examples, the first fluid control member 224 and/or the second fluid control member 226 can be provided with different initial positions such that the angle 349 is different (e.g., greater than 90 degrees or less than 90 degrees).

Additionally, in some examples (e.g., where the fluid 238 includes the MR fluid), the clutch mechanism 120 includes means for providing an electric current to the fluid 238 to change one or more characteristics (e.g., any of viscosity, stiffness, and the like) of the fluid 238. In some such examples, the means for providing the electric current is one or more electrical conductors in direct contact with the fluid 238. Further, in some such examples, the means for providing the electric current is a surface on the spool 316 that is substantially conductive and in direct contact with the fluid 238. Further still, in some such examples, the means for providing the electric current is a surface on the housing 202 or a portion 214, 216 thereof that is conductive and in direct contact with the fluid 238. Further still, in some such examples, the means for providing the electric current is a surface on one of the bar members 122, 124 that is substantially conductive and in direct contact with the fluid 238.

In some examples (e.g., where the first bar member 122 is tubular), such a conductive surface can be arranged along an internal portion of the first bar member 122 and connected with an electrical conductor having a portion that protrudes from an outer surface of the first bar member 122. Similarly, in some examples (e.g., where the second bar member 124 is tubular), such a conductive surface can be arranged along an internal portion of the second bar member 124 and connected with another electrical conductor having a portion that protrudes from an outer surface of second bar member 124. In such examples, the conductive surface(s) is/are prevented from being exposed.

FIGS. 3B and 3C are additional cross-sectional views of the clutch mechanism 120 taken along lines A-A of FIG. 2B and show different example states of the clutch mechanism 120. Turning to FIG. 3B, the clutch mechanism 120 is in the first state thereof. According to the illustrated example of FIG. 3B, each of the first fluid valve 130 and the second fluid valve 132 is closed or in the second valve position, while the third fluid valve 134 is open or in the first valve position. In particular, the fluid 238 of FIG. 3B can flow through the third fluid valve 134 between the first and second sections 308, 310 of the primary fluid chamber 210. On the other hand, the fluid 238 of FIG. 3B is prevented from flowing through the first and second fluid valves 130, 132 between the primary and secondary fluid chambers 210, 212. As a result, a certain portion of the fluid 238 is substantially maintained or kept in the first and second sections 308, 310 while the clutch mechanism 120 is in the first state. Thus, when one of the bar members 122, 124 inputs energy to the clutch mechanism 120 of FIG. 3B, the clutch mechanism 120 transfers, via the fluid 238 and the fluid control members 224, 226, substantially all of the energy to the other one of the bar members 122, 124. That is, such energy input the clutch mechanism 120 of FIG. 3B is transmittable through the fluid 238 in the primary fluid chamber 210 from the first fluid control member 224 to the second fluid control member 226 and/or vice versa.

For example, during the driving event, the first bar member 122 can apply the input torque 232 to the first fluid control member 224, thereby urging the first fluid control member 224 to rotate relative to the housing 202 about the axis 206. In some examples, as the first fluid control member 224 of FIG. 3B is urged in the first rotational direction 302, the first fluid control member 224 pushes the fluid 238 to increase the fluid pressure in the first and second sections 308, 310 of the primary fluid chamber 210. Consequently, in such examples, the fluid 238 pushes the second fluid control member 226. As such, when the clutch mechanism 120 is in the first state thereof, a certain fluid path 351 may be created along which the fluid 238 can flow, where the fluid path 351 passes through the third fluid valve 134 from the first section 308 of the primary fluid chamber 210 to the second section 310. More particularly, in FIG. 3B, the fluid 238 applies a certain pressure gradient force 352 to the second fluid control member 226 resulting from different fluid pressures in the respective second and third sections 310, 312, which urges the second fluid control member 226 to rotate relative to the housing 202 in the first rotational direction 302. In this manner, the second fluid control member 226 and/or, more generally, the clutch mechanism 120 generates an output torque 354 for the second bar member 124 and/or applies the output torque 354 to the second bar member 124 during the driving event, a magnitude of which is based on a magnitude of the pressure gradient force 352.

The pressure gradient force 352 of FIG. 3B is substantially defined by the fluid pressures in the respective second and third sections 310, 312 of the primary fluid chamber 210. Accordingly, the output torque 354 of FIG. 3B can be decreased by decreasing the fluid pressure in the second section 310 relative to the third section 312. In some examples, the control circuitry 108 can be configured to open the first fluid valve 130 of FIG. 3B and/or the second fluid valve 132 of FIG. 3B to decrease the output torque 354, which relieves pressure in the second section 310. In such examples, to further decrease the output torque 354, the control circuitry 108 can be configured to close the third valve 134 of FIG. 3B, while opening or keeping open the first fluid valve 130 and/or the second fluid valve 132. More generally, one or more of the fluid valves 130, 132, 134 of FIG. 3B is/are configured to change position (e.g. open and/or close) to adjust (e.g., decrease) energy transmitted through the fluid 238 from the first fluid control member 224 to the second fluid control member 226 during the driving event.

When the clutch mechanism 120 is operating in the first state thereof, the first and second fluid control members 224, 226 can rotate cooperatively together or substantially in tandem relative to the housing 202 about the axis 206 in the same direction (e.g., temporarily and/or during the driving event). As shown in FIG. 3B, the first fluid control member 224 can rotate through a first angle 356 in the first rotational direction 302 from the initial position of the first fluid control member 224 to a second position thereof, and the second fluid control member 226 can rotate through a second angle 358 in the first rotational direction 302 from the initial position of the second fluid control member 226 to a second position thereof.

In some examples, the fluid valves 130, 132, 134 of FIG. 3A are configured to provide and/or maintain the first state of the clutch mechanism 120 when the fluid valves 130, 132, 134 are in an unpowered state, which improves vehicle safety during an electrical failure event. In such examples, each of the first and second fluid valves 130, 132 is configured to be normally closed while no electrical power is provided to the first and second fluid valves 130, 132. On the other hand, in such examples, the third fluid valve 134 is configured to be normally open while no electrical power is provided to the third fluid valve 134. As such, the clutch mechanism 120 can couple the first bar member 122 to the second bar member 124 when the fluid valve(s) 130, 132, 134 are in the unpowered state.

Additionally, in some examples (e.g., where the fluid 238 is incompressible), the clutch mechanism 120 of FIG. 3B can achieve an output or torque ratio that is substantially 1:1, for example, such that the output torque 354 is substantially equal to the input torque 232. As shown in FIG. 3B, the second angle 358 is substantially equal to the first angle 356. In such examples, a volume (i.e., a combined volume) of the first and second sections 308, 310 of the primary fluid chamber 210 is substantially maintained, and a volume of the third section 312 of the primary fluid chamber 210 is substantially maintained. Accordingly, the clutch mechanism 120 of FIG. 3B is configured to substantially maintain the gap 348 between the first and second fluid control members 224, 226. In such examples, substantially no angular deviation between the first and second fluid control member 224, 226 is permitted.

Turning to FIG. 3C, the clutch mechanism 120 is in the second state thereof. According to the illustrated example of FIG. 3C, each of the first fluid valve 130 and the second fluid valve 132 is open or in the first valve position, while the third fluid valve 134 is closed or in the second valve position. In particular, the fluid 238 of FIG. 3C can flow through the first fluid valve 130 between the first section 308 of the primary fluid chamber 210 and the secondary fluid chamber 212. Additionally or alternatively, the fluid 238 of FIG. 3C can flow through the second fluid valve 132 between the second section 310 of the primary fluid chamber 210 and the secondary fluid chamber 212. On the other hand, the fluid 238 of FIG. 3B is prevented from flowing through the third fluid valve 134. As a result, a certain portion of the fluid 238 can be expelled from the first section 308 and/or the second section 310 while the clutch mechanism 120 is in the second state. Thus, when one of the bar members 122, 124 inputs energy to the clutch mechanism 120 of FIG. 3C, the clutch mechanism 120 substantially dissipates the energy therein and/or does not transfer the energy to the other one of the bar members 122, 124. That is, such energy input to the clutch mechanism 120 of FIG. 3C is not transmittable through the fluid 238 in the primary fluid chamber 210 from the first fluid control member 224 to the second fluid control member 226 and/or vice versa For example, during the driving event, the first bar member 122 can apply the input torque 232 to the first fluid control member 224, thereby urging the first fluid control member 224 to rotate relative to the housing 202. In some examples, as the first fluid control member 224 of FIG. 3C is urged in the first rotational direction 302, the first fluid control member 224 pushes the fluid 238 to increase the fluid pressure in the first section 308 of the primary fluid chamber 210 but not the fluid pressure in the second section 310. In contrast to the illustrated example of FIG. 3B, angular movement of the first fluid control member 224 does not substantially change the fluid pressure in the second section 310 of the primary fluid chamber 210. Consequently, in such examples, the fluid 238 is expelled from the first section 308 through the first fluid valve 130 as the first fluid control member 224 moves from the initial position thereof to the second position thereof. More particularly, in FIG. 3B, the fluid 238 can flow through the orifice 314 from the secondary fluid chamber 212 to the third section 312 of the primary fluid chamber 210. As such, when the clutch mechanism 120 is in the second state thereof, a different fluid path 360 is created along which the fluid 238 can flow, where the different fluid path 360 may pass through the first fluid valve 130, the secondary fluid chamber 212, and the orifice 314 from the first section 308 of the primary fluid chamber 210 to the third section 312. In further contrast to the illustrated example of FIG. 3A, substantially no pressure gradient force is applied to the second fluid control member 224 resulting from substantially equal fluid pressures in the respective second and third sections 310, 312. As a result, the output torque 354 for the second bar member 124 is not generated during the driving event.

When the clutch mechanism 120 is operating in the second state thereof, the first fluid control member 224 and/or the second fluid control member 226 can rotate independently relative to the housing 202 about the axis 206 due to the ability of the fluid 238 to freely flow through the first and second valves 130, 132 and, in some examples, through the orifice 314. As shown in FIG. 3C, the first fluid control member 224 can rotate in the first rotational direction 302 away from the initial position of the first fluid control member 224, while the second fluid control member 226 is substantially immobile. Additionally, in some examples, opening the third fluid valve 134 may facilitate such independent movement.

In FIG. 3C, the volumes of the respective first, second, and third sections 308, 310, 312 of the primary fluid chamber 210 can vary during clutch operation. Accordingly, when in the second state, the clutch mechanism 120 is configured to allow substantial variance in the gap 348 between the first and second fluid control members 224, 226.

According to the illustrated example of FIG. 3C, the output torque 354 can be provided by increasing the fluid pressure in the second section 310 relative to the third section 312. In some examples, the control circuitry 108 can be configured to close the first fluid valve 130 of FIG. 3C and open the third fluid valve 134 of FIG. 3C to generate and/or increase the output torque 354. In such examples, to further increase the output torque 354, the control circuitry 108 can be configured to close the second fluid valve 132 of FIG. 3C along with the first fluid valve 130, while opening the third fluid valve 132. More generally, at least two of the fluid valves 130, 132, 134 of FIG. 3B are configured to change position (e.g. open and/or close) to adjust (e.g., increase) energy transmitted through the fluid 238 from the first fluid control member 224 to the second fluid control member 226 during the driving event.

In some examples, should an electrical failure event occur in connection with the clutch mechanism 120 of FIG. 3B, the first state of the clutch mechanism 120 activates in response to the fluid valves 130, 132, 134 changing from a powered state to the unpowered state. In such examples, each of the first and second fluid valves 130, 132 of FIG. 3C is configured to automatically close and/or remain closed in the absence of electrical power, while the third fluid valve 134 is configured to automatically open and/or remain open in the absence of electrical power.

While FIGS. 3B and 3C depict the first fluid control member 224 as an input member receiving the input torque 232 and the second fluid control member 226 as an output member that may generate the output torque 354, in some examples, the clutch mechanism 120 can be implemented differently. Of course, the second fluid control member 224 can likewise receive such an input torque, and/or the first fluid control member 224 can likewise generate an output torque for the first bar member 122 based on the input torque.

Figure 4:
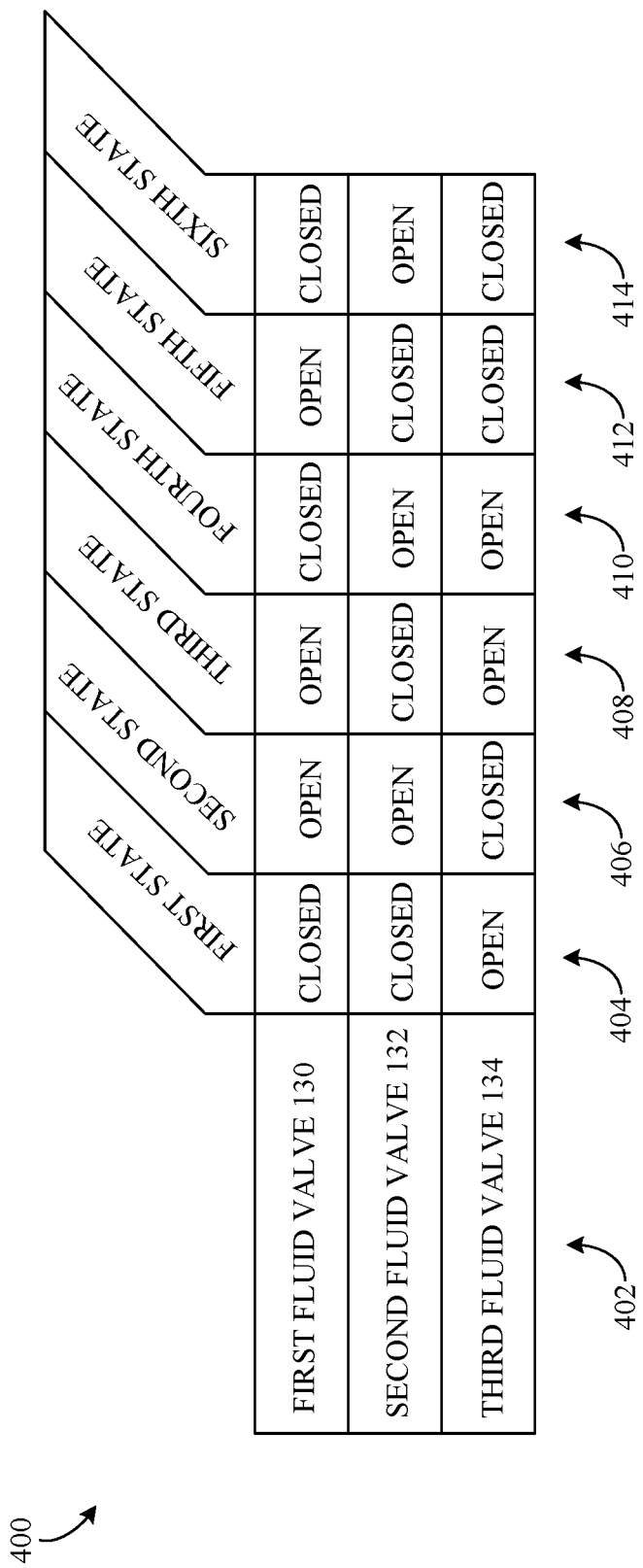
FIG. 4 is a table of example valve configurations that can be used in connection with operating example clutch mechanisms disclosed herein.

FIG. 4 is a table 400 of example valve configurations that can be used in connection with operating the clutch mechanism 120. In particular, the table 400 or data thereof can be preprogrammed into the control circuitry 108 (e.g., via the database 510 described below), which enables the control circuitry 108 to effectively control the clutch mechanism 120 and/or provide state changes thereof.

In FIG. 4, the table 400 includes a first column 402 corresponding to the first, second, and third fluid valves 130, 132, 134. Further, the table 400 includes a second column 404 representing certain positions of the respective fluid valves 130, 132, 134 that provide the first state of the clutch mechanism 120 (e.g., see FIG. 3B). The table 400 also includes a third column 406 representing certain positions of the respective fluid valves 130, 132, 134 that provide the second state of the clutch mechanism 120 (e.g., see FIG. 3C).

As previously mentioned, the clutch mechanism 120 can be configured to have one or more different states in addition or alternatively to the first and second states. As shown in FIG. 4, the table 400 includes a fourth column 408 representing certain positions of the respective fluid valves 130, 132, 134 that provide a third state of the clutch mechanism 120 in which the first bar member 122 moves substantially more compared to the second bar member 124. In particular, when the clutch mechanism 120 is in the third state thereof, the first fluid control member 224 can displace more of the fluid 238 compared to the second fluid control member 226. For example, the first fluid control member 224 can push the fluid 238 through the first fluid valve 130 and the orifice 314, while the second fluid control member 226 can push the fluid 238 only through the third fluid valve 134. On the other hand, the table 400 of FIG. 4 also includes a fifth column 410 representing certain positions corresponding to the respective fluid valves 130, 132, 134 that provide a fourth state of the clutch mechanism 120 in which the second bar member 124 moves substantially more compared to the first bar member 122. In particular, when the clutch mechanism 120 is in the fourth state thereof, the second fluid control member 226 can displace more of the fluid 238 compared to the first fluid control member 224.

Additionally or alternatively, in some examples, the table 400 includes a sixth column 412 representing certain valve positions of the respective fluid valves 130, 132, 134 that provide a fifth state of the clutch mechanism 120 in which only the first bar member 122 is movable while the second bar member 124 is immobile. On the other hand, in such examples, the table 400 also includes a seventh column 414 representing certain valve positions of the respective fluid valves 130, 132, 134 that provide a sixth state of the clutch mechanism 120 in which only the second fluid control member 226 is movable while the first fluid control member 224 is immobile.

Each of the third, fourth, fifth, and sixth states of the clutch mechanism 120 is sometimes referred to as an intermediate state and may facilitate position resetting functionality associated with resetting (a) the position of the first fluid control member 224 and/or (b) the position of the second fluid control member 226. In some examples, the control circuitry 108 is configured to selectively change the clutch mechanism 120 between at least some or all of the third, fourth, fifth, and sixth states, for example, while the size of the gap 348 is less than the threshold gap size. In this manner, the control circuitry causes (a) the first fluid control member 224 to move toward or to the initial position thereof and/or (b) the second fluid control member 226 to move toward or to the initial position thereof.

Figure 5:
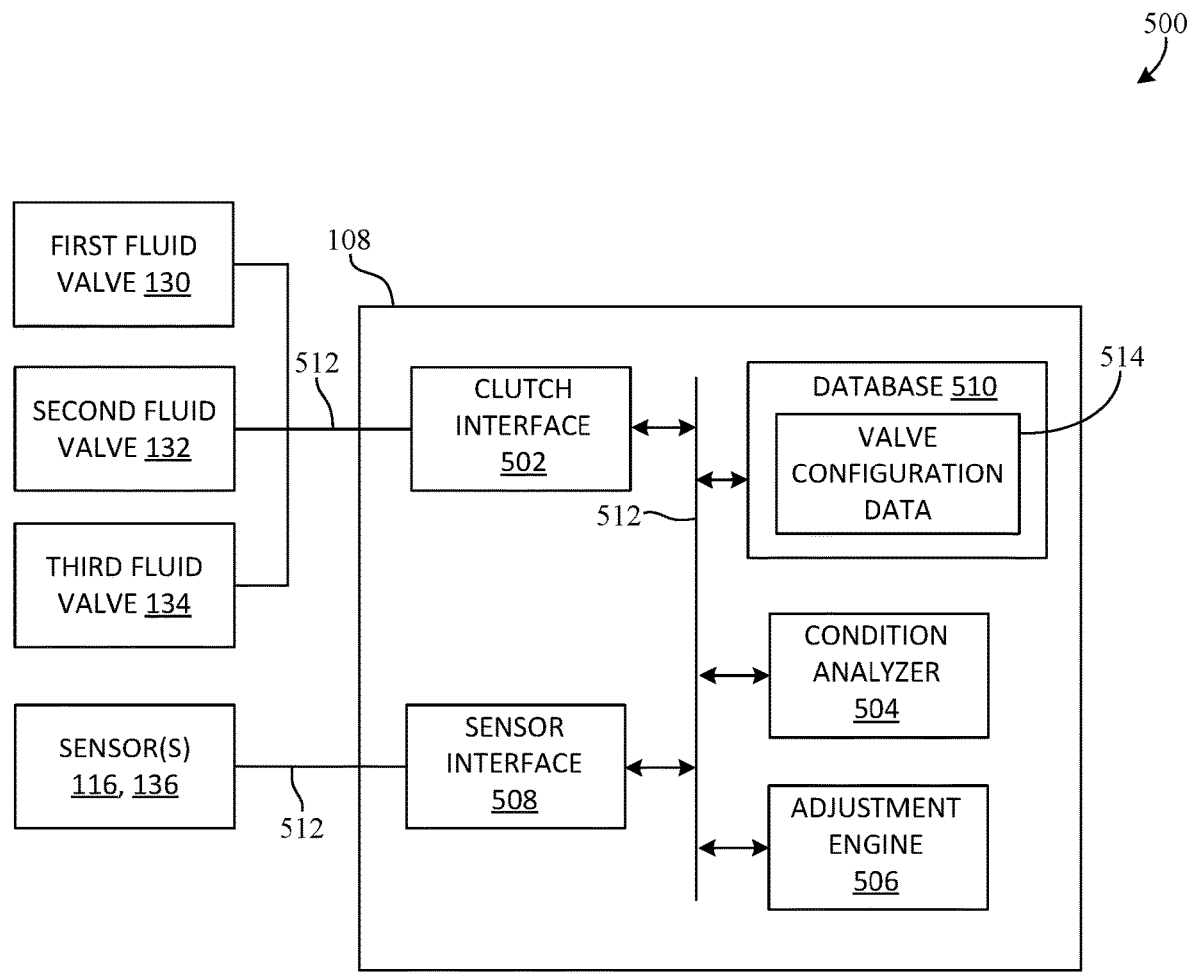
FIG. 5 is a block diagram of an example control system for clutch mechanisms disclosed herein.

FIG. 5 is a block diagram of an example control system 500 for the clutch mechanism 120. The control system 500 can be implemented, for example, by the control circuitry 108 of FIGS. 1A and 1B. According to the illustrated example of FIG. 5, the control system 500 includes an example clutch interface 502, an example condition analyzer 504, an example adjustment engine 506, an example sensor interface 508, and an example database 510. The control system 500 of FIG. 5 is communicatively coupled to the first fluid valve 130, the second fluid valve 132, the third fluid valve 134, and the sensor(s) 116, 136 via one or more example communication links 512 such as, for example, one or more signal or transmission wires, a bus, radio frequency, and the like, or a combination thereof. Additionally, the control system 500 can be communicatively coupled to the vehicle 102 and/or one or more systems thereof via the communication link(s) 512. In particular, the clutch interface 502 of FIG. 5 is configured to provide one or more advantageous control signals or commands and/or electrical power to the first fluid valve 130, the second fluid valve 132, and/or the third fluid valve 134 to enable the clutch mechanism 120 to control (e.g., increase, decrease, limit, and/or maintain) torque transferred between the first and second bar members 122, 124 during the driving event previously described.

To adjust the roll stiffness of the vehicle 102, the control system 500 of FIG. 5 directs the fluid valve(s) 130, 132, 134 to change or transition the clutch mechanism 120 from an initial clutch state to a subsequent clutch state. For example, the control system 500 can direct the fluid valve(s) 130, 132, 134 to change clutch mechanism 120 from the first state thereof to the second state thereof previously described, which decreases the roll stiffness of the vehicle 102. Conversely, the control system 500 can direct the fluid valve(s) 130, 132, 134 to change the clutch mechanism 120 from the second state thereof to the first state thereof, which increases the roll stiffness of the vehicle 102. Of course, other state changes of the clutch mechanism 120 can be achieved by the control system 500 in connection with the third state, the fourth state, the fifth state, and/or the sixth state of the clutch mechanism 120 previously described. The control system 500 may initiate such state changes of the clutch mechanism 120 before, during, or after the driving event.

In the example of FIG. 5, the clutch interface 502 facilitates interactions and/or communications between the control system 500 and the clutch mechanism 120. The clutch interface 502 of FIG. 5 is communicatively coupled to the first fluid valve 130 or a valve actuator thereof via the communication link(s) 512 to transmit the control signal(s) or command(s) and/or electrical power to the first fluid valve 130 or the valve actuator thereof. In some examples, the clutch interface 502 directs the first fluid valve 130 to open, close, and/or otherwise change position. Further, the clutch interface 502 of FIG. 5 is communicatively coupled to the second fluid valve 132 or a valve actuator thereof via the communication link(s) 512 to transmit the control signal(s) or command(s) and/or electrical power to the second fluid valve 132 or the valve actuator thereof. In some examples, the clutch interface 502 directs the second fluid valve 132 to open, close, and/or otherwise change position. Further, the clutch interface 502 of FIG. 5 is communicatively coupled to the third fluid valve 134 or a valve actuator thereof via the communication link(s) 512 to transmit the control signal(s) or command(s) and/or electrical power to the third fluid valve 134 or the valve actuator thereof. In some examples, the clutch interface 502 directs the third fluid valve 134 to open, close, and/or otherwise change position.

Additionally, in some examples (e.g., where the fluid 238 includes the MR fluid), the clutch interface 502 is electrically coupled, via the link(s) 512, to the means for applying the electric current to the fluid 238. In such examples, the clutch interface 502 is configured to provide and/or transmit the electric current to means for applying the electric current, for example, when the clutch mechanism 120 is in the first state thereof. Further, the clutch interface 502 can cease such current transmission, for example, in response to the clutch mechanism 120 changing from the first state thereof to the second state thereof.

To determine whether to change the state of the clutch mechanism 120, the condition analyzer 504 of FIG. 5 processes data received from the sensor interface 508 and/or the database 510. In particular, the condition analyzer 504 determines whether a condition associated with the vehicle 102 indicates that vehicle roll stiffness should be adjusted, which can serve as an effective trigger for the adjustment engine 506 and the clutch interface 502. Such a condition associated with the vehicle 102 is sometimes referred to as a condition of interest. If the condition of interest is determined or predicted, the condition analyzer 504 enables (a) the adjustment engine 506 to provide one or more advantageous adjustments for the fluid valve(s) 130, 132, 134 and (b) the clutch interface 502 to carry out or execute the adjustment(s). The condition analyzer 504 of FIG. 5 may transmit, via the communication link(s) 512, detected condition(s) associated with the vehicle 102 and/or related data to the adjustment engine 506 for processing.

Generally speaking, relatively low vehicle speeds may not require connection of the first and second bar members 122, 124. For example, in certain off-road driving scenarios, disconnecting the first bar member 122 from the second bar members 124 allows for more articulation of each wheel of the vehicle 102 relative to another. Accordingly, the condition analyzer 504 can be configured to detect, based on obtained data associated with the vehicle 102, when the vehicle 102 is transitioning or likely to transition from driving on-road to driving off-road, which enables the adjustment engine 506 and the clutch interface 502 to control the clutch mechanism 120 in a manner that results in decreasing the roll stiffness of the vehicle 102 and/or disconnecting the first bar member 122 from the second bar member 124. On the other hand, relatively high vehicle speeds may require connection of the first and second bar members 122, 124.

In some examples, the condition analyzer 504 determines whether one or more settings of the vehicle 102 is/are active or enabled associated with providing a predetermined vehicle roll stiffness that is different from a present vehicle roll stiffness. Additionally or alternatively, in some examples, the condition analyzer 504 can determine whether a certain driving mode (e.g., any of an off-road driving mode, a sport driving mode, and the like) of the vehicle 102 activates, which may indicate that the driving event is likely to occur and/or correlates to an increased amount of vehicle body roll during the driving event. Additionally or alternatively, in some examples, the condition analyzer 504 determines or predicts whether the vehicle 102 will encounter a certain road curvature and/or perform a certain vehicle maneuver (e.g., a relatively high speed turn).

Additionally or alternatively, in some examples (e.g., where the clutch mechanism 120 includes the proximity sensor(s) 136), the condition analyzer 504 determines whether spacing of the first and second bar members 122, 124 satisfies certain spacing criteria (e.g., stored in the database 510). In such examples, the condition analyzer 504 can compare the size of the gap 348 to the threshold gap size (e.g., stored in the database 510) and determine, based on such a comparison, whether the size of the gap 348 is less than the threshold gap size. Further, the condition analyzer 504 can compare the angle 349 to a threshold angle (e.g., stored in the database 510) and determine, based on such a comparison, whether the angle 349 is less than a threshold angle.

While certain example conditions have been described, it should be understood that the condition analyzer 504 can be configured to detect one or more additional and/or different conditions of interest associated with the vehicle 102.

In the example of FIG. 5, the adjustment engine 506 performs one or more calculations associated with controlling the fluid valve(s) 130, 132, 134. As such, in some examples, the adjustment engine 506 transmits, via the communication link(s) 512, computed data to the database 510 and/or the clutch interface 502. In particular, the adjustment engine 506 determines one or more example valve adjustments associated with changing the state of the clutch mechanism 120 and/or moving the fluid control member(s) 224, 226. For example, one of the valve adjustments can include changing a position of at least one of the fluid valves 130, 132, 134 while maintaining positions of the other fluid valve(s) 130, 132, 134. In another example, one of the valve adjustments can include changing positions of two or more (e.g., all) of the fluid valve(s) 130, 132, 134. In another example, one of the valve adjustments includes selectively opening and closing the fluid valve(s) 130, 132, 134, for example, while the size of the gap 348 is less than the threshold gap size. After determining such valve adjustment(s), the adjustment engine 506 transmits, via the communication link(s) 512, the adjustment(s) to the clutch interface 502 to control the fluid valve(s) 130, 132, 134 accordingly.

In some examples, the adjustment engine 506 determines, based on the condition detected by the condition analyzer 504, how to adjust the vehicle roll stiffness and/or the torque transferred between the first and second bar members 122, 124 during the driving event. In particular, the adjustment engine 506 can determine whether to increase, decrease, limit, and/or maintain the torque transferred by the clutch mechanism 120. For example, the adjustment engine 506 can determine to decrease the torque and/or disconnect the first bar member 122 from the second bar member 124 in response to detecting that the vehicle 102 transitioned or will likely transition from driving on-road to driving off-road. Conversely, the adjustment engine 506 can determine to increase the torque and/or connect the first bar member 122 to the second bar member 124 in response to detecting that the vehicle 102 transitioned or will likely transition from driving off-road to driving on road.

Further, to determine how to suitably change the state of the clutch mechanism 120 or which state of the clutch mechanism 120 to select, the adjustment engine 506 utilizes example valve configuration data 514 in the database 510. The valve configuration data 514 of FIG. 5 can include one or more predefined valve configurations for the fluid valve(s) 130, 132, 134 of the clutch mechanism 120 associated with providing the respective states of the clutch mechanism 120. Each of the predefined valve configurations may correlate to a certain or approximate vehicle roll stiffness provided by the clutch mechanism 120. In some such examples, the valve configuration data includes the table 400 shown in FIG. 4 and/or data indicative of the table 400. For example, while the vehicle 102 is in operation, the adjustment engine 506 can access the valve configuration data 514 to obtain the predefined valve configurations for the fluid valves 130, 132, 134. Then, the adjustment engine 506 can select one of the predefined valve configurations based on the detected vehicle condition, and the clutch interface 502 can proceed to open or close at least one of the fluid valve(s) 130, 132, 134 in accordance with the selected one of the predefined valve configurations. Additionally, in some examples (e.g., where the clutch mechanism 120 includes the proximity sensor(s) 136), the adjustment engine 506 can calculate and/or determine the valve adjustment(s) based on the gap 348 and/or the angle 349 between the first and second fluid control members 224, 226.

In the example of FIG. 5, the sensor interface 508 is communicatively coupled to the sensors 116, 136 previously described via the communication link(s) 512 to receive sensor data therefrom. The sensor(s) 116, 136 can provide sensor data associated with operation of the vehicle 102 and/or a vehicle stabilizer bar 104, 106 to the sensor interface 508. For example, at least some of the sensor(s) 116 can provide any of vehicle speed data, road input data, steering input data, and the like to the sensor interface 508. After receiving the sensor data, the sensor interface 508 transmits, via the link(s) 512, the sensor data to the condition analyzer 504, the adjustment engine 506, and/or the database 510.

In some examples, the proximity sensor(s) 136 provide sensor data indicative of the gap 348 between the first and second fluid control members 224, 226. Additionally or alternatively, the proximity sensor(s) 136 can provide sensor data indicative of the angle 349 by which the first fluid control member 224 is spaced from the second fluid control member 226. In such examples, the sensor interface 508 detects the gap 348 and/or the angle 349 via the proximity sensor(s) 136 and/or based on the sensor data. Additionally or alternatively, the sensor interface 508 can detect the size of the gap 348 via the proximity sensor(s) 136 and/or based on the sensor data Further, in some examples, the proximity sensor(s) 136 provide sensor data indicative of the relative position of the first fluid control member 224 and/or a change in the relative position (e.g., an angular velocity, an angular acceleration, etc.) to the sensor interface 508. In such examples, the sensor interface 508 can detect the relative position of the first fluid control member 224 and/or the change therein via the proximity sensor(s) 136 and/or based on the sensor data. Similarly, in some examples, the proximity sensor(s) 136 provide sensor data indicative of the relative position of the second fluid control member 226 and/or a change in the relative position (e.g., an angular velocity, an angular acceleration, etc.) to the sensor interface 508. In such examples, the sensor interface 508 detects the relative position of the second fluid control member 226 and/or the change therein via the proximity sensor(s) 136 and/or based on the sensor data.

Further still, at least some of the sensor(s) 116 can provide data associated with a driving surface and/or an external vehicle environment to the sensor interface 508. Such data may indicate to the control system 500 a potential or imminent driving event where adjusting vehicle roll stiffness is advantageous.

In the example of FIG. 5, the database 510 stores (e.g., temporarily and/or permanently) and/or provides access to data. For example, the database 510 can store and/or provide access to sensor data, road condition data, and the like. The database 510 of FIG. 5 is communicatively coupled, via the link(s) 512, to the clutch interface 502, the condition analyzer 504, the adjustment engine 506, and the sensor interface 508. In some examples, any one or more (e.g., all) of the clutch interface 502, the condition analyzer 504, the adjustment engine 506, and/or the sensor interface 508 transmit (e.g., repeatedly and/or continuously) data to the database 510. Conversely, in some examples, the database 510 transmits (e.g., repeatedly or continuously) data to any one or more (e.g., all) of the clutch interface 502, the condition analyzer 504, the adjustment engine 506, and/or the sensor interface 508.

In some examples, the database 510 stores the valve configuration data 514 associated with the clutch mechanism 120. As previously mentioned, the valve configuration data 514 can be preprogrammed into the database 510. Additionally, the valve configuration data 514 can be updated in the database 510. Further, the database 510 can store spacing criteria associated with the first and second fluid control members 224, 226 including the threshold gap size.

In some examples, the control system 500 of FIG. 5 utilizes the obtained data described above to control the clutch mechanism 120 in a manner that varies the roll stiffness of the vehicle 102 during the driving event. That is, in such examples, the control system 500 controls the clutch mechanism 120 in real-time or substantially real-time. Additionally, in examples where the fluid 238 includes the MR fluid (or a similar fluid responsive to electric current), the control system 500 can adjust damping in the clutch mechanism 120 based on any of the vehicle speed data, the road input data, the steering input data, and the like.

While an example manner of implementing the control system 500 is illustrated in FIG. 5, one or more of the elements, processes, and/or devices illustrated in FIG. 5 may be combined, divided, rearranged, omitted, eliminated, and/or implemented in any other way. Further, the example control system 500 of FIG. 5 may include one or more elements, processes, and/or devices in addition or alternatively to those illustrated in FIG. 5, and/or may include more than one of any of the illustrated elements, processes, and devices.

Additionally, one or more of the example control circuitry 108, the example clutch interface 502, the example condition analyzer 504, the example adjustment engine 506, the example sensor interface 508, the example database 510, and/or, more generally, the example control system 500 of FIG. 5 may be implemented by hardware, software, firmware and/or any combination thereof. For example, one or more of the control circuitry 108, the clutch interface 502, the condition analyzer 504, the adjustment engine 506, the sensor interface 508, the database 510, and/or, more generally, the control system 500 could be implemented by one or more circuits (e.g., an analog or digital circuit, a logic circuit, a programmable processor, etc.). Further, in some examples, at least one of the control circuitry 108, the clutch interface 502, the condition analyzer 504, the adjustment engine 506, the sensor interface 508, the database 510, and/or the control system 500 include(s) a tangible machine-readable storage device or storage disk (e.g., a memory storing the software and/or firmware).

Figure 6:
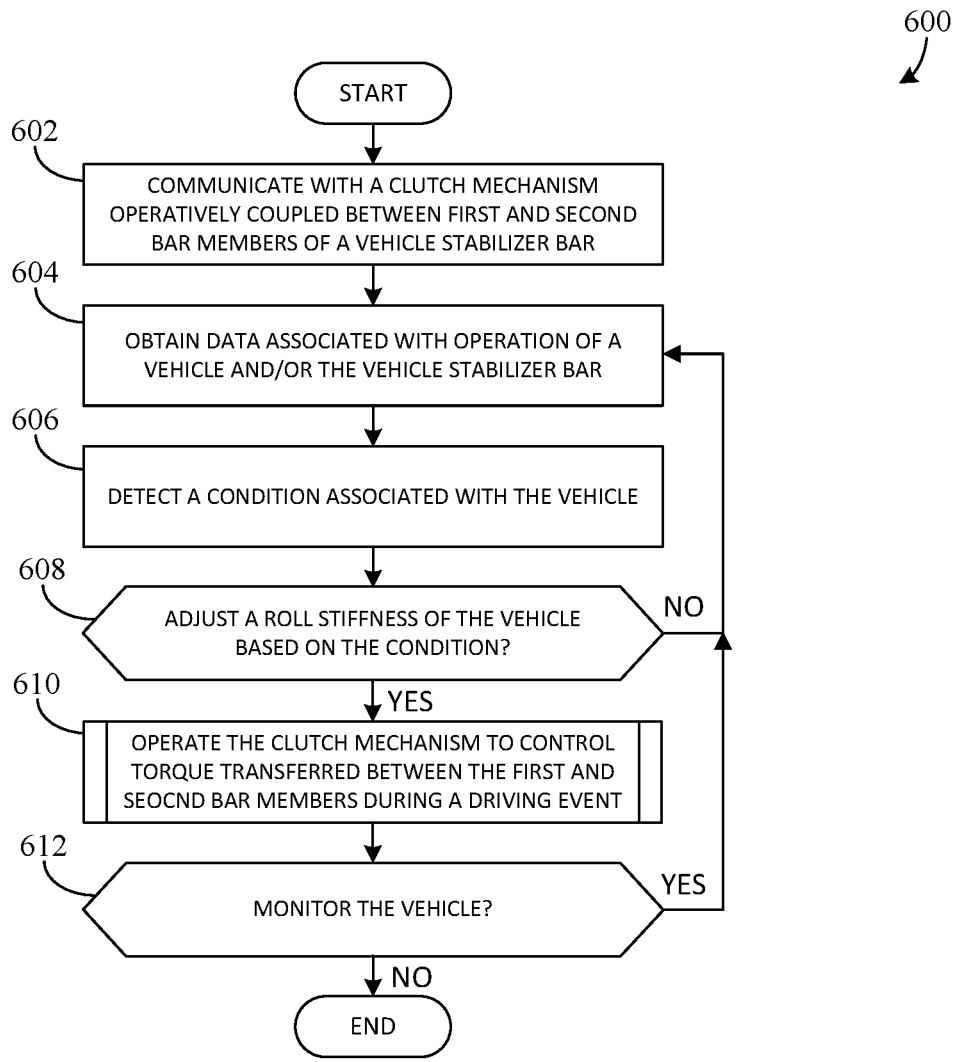
FIG. 6 illustrates a flowchart representative of an example method that can be implemented to control vehicle roll stiffness.
Figure 7:
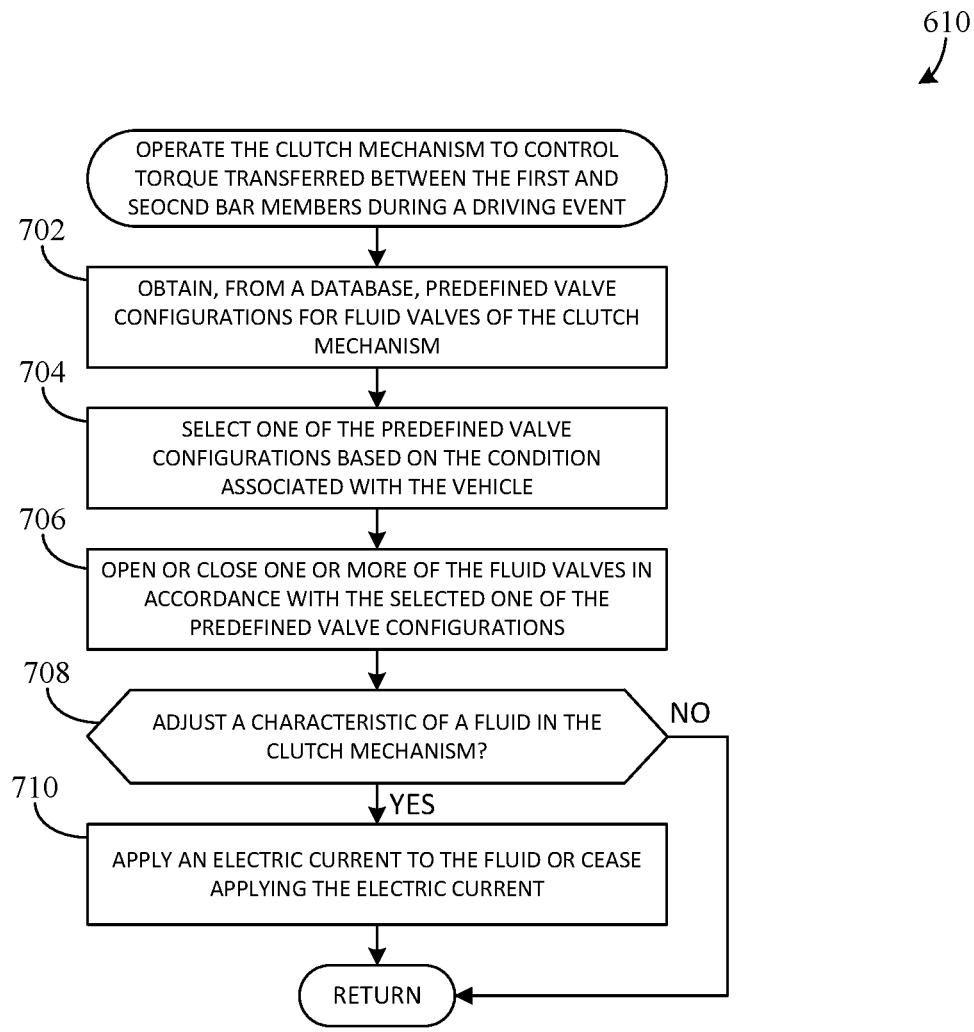
FIG. 7 illustrates a flowchart representative of an example method that can be implemented to operate clutch mechanisms disclosed herein.
Figure 8:
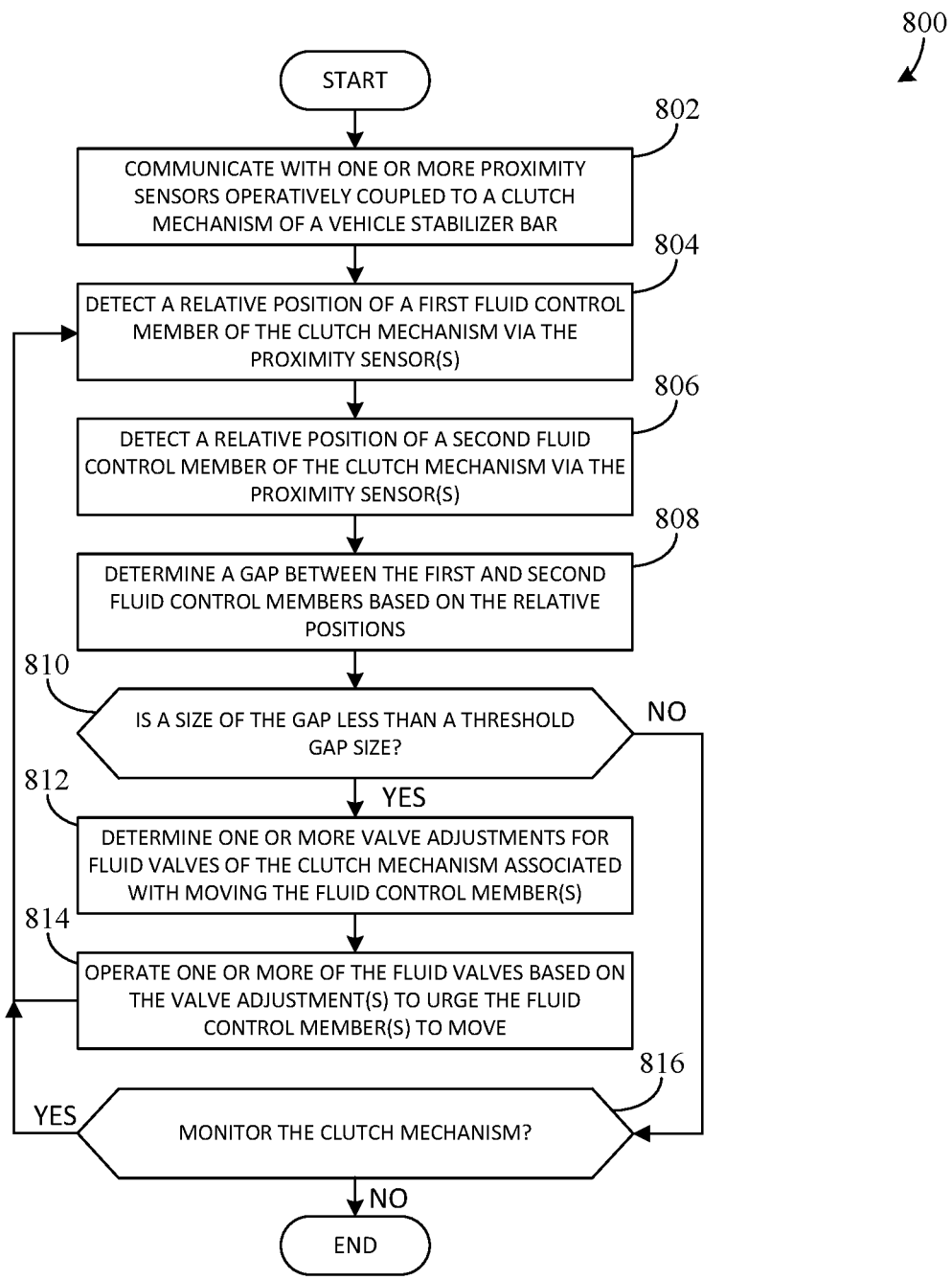
FIG. 8 illustrates a flowchart representative of an example method that can be implemented to reset fluid control members of a clutch mechanism disclosed herein.

Flowcharts representative of example hardware logic or machine-readable instructions for implementing the example control system 500 of FIG. 5 are shown in FIGS. 6-8. The machine-readable instructions may be a program or portion of a program for execution by a processor such as the processor 902 shown in the example processor platform 900, which is discussed in greater detail below in connection with FIG. 9. The program may be embodied in software stored on a tangible machine-readable storage medium such as a CD-ROM, a floppy disk, a hard drive, or a memory associated with the processor 902, but the entire program and/or parts thereof could be alternatively executed by a different device and/or embodied in firmware or dedicated hardware. Further, although the example program is described with reference to the flowcharts illustrated in FIGS. 6-8, many other methods of implementing the example control system 500 may alternatively be used. For example, the order of execution of the blocks may be changed, and/or some of the blocks described may be changed, eliminated, or combined. Additionally or alternatively, any of the blocks may be implemented by one or more hardware circuits (e.g., discrete and/or integrated analog and/or digital circuitry, logic circuit, a comparator, etc.).

As mentioned above, the example processes of FIGS. 6-8 may be implemented using executable or coded instructions (e.g. computer or machine readable instructions) stored on a tangible machine-readable storage medium such as a hard disk drive, a compact disk (CD), a flash memory, and/or other storage device or disk in which information is stored for any duration of time. As used herein, the term tangible machine-readable storage medium is expressly defined to include any type of computer or machine-readable storage device or disk and exclude propagating signals and all transmission media. Additionally or alternatively, the example process of FIGS. 6-8 may be implemented using coded instructions stored on a non-transitory machine-readable medium in which information is stored for any duration, which includes any type of computer or machine readable storage device or disk and excludes propagating signals and transmission media.

FIG. 6 illustrates a flowchart representative of an example method 600 that can be implemented to control vehicle roll stiffness. The example method 600 of FIG. 6 can be implemented in any of the stabilizer bar disconnect system 100, the vehicle 102, the stabilizer bar assembly 110, and/or the control system 500 previously described.

The example method 600 of FIG. 6 begins by communicating with a clutch mechanism operatively coupled between first and second bar members of a vehicle stabilizer bar (block 602). In some examples, the control system 500 of FIG. 5 communicates (e.g., via the clutch interface 502) with the clutch mechanism 120. As previously described, the clutch mechanism 120 can be operatively coupled between the first and second bar members 122, 124. In particular, the control system 500 can communicate with the first fluid valve 130, the second fluid valve 132, and/or the third fluid valve 134 to provide an initial state of the clutch mechanism 120 and/or maintain the initial state, for example, until the control system 500 detects a certain condition associated with the vehicle 102.

The example method 600 of FIG. 6 also includes obtaining data associated with operation of the vehicle 102 and/or the vehicle stabilizer bar (block 604). In some examples, the control system 500 obtains (e.g., via the sensor interface 508) at least some or all of the data previously described, for example, from the sensor(s) 116, 136 and/or the system(s) of the vehicle 102. For example, the control system 500 can obtain any of the vehicle speed data, the road input data, the steering input data, and the like.

The example method 600 of FIG. 6 also includes detecting a condition associated with the vehicle (block 606). In some examples, the control system 500 of FIG. 5 detects (e.g., via the condition analyzer 504) the condition of interest associated with the vehicle 102 previously described in connection with FIG. 5, which indicates to the control system 500 that the roll stiffness of the vehicle 102 should be adjusted. On the other hand, in some examples, the control system 500 can detect a different condition associated with the vehicle 102 indicative of maintaining the roll stiffness.

The example method 600 of FIG. 6 also includes determining whether to adjust a roll stiffness of the vehicle based on the condition (block 608). In some examples, the control system 500 of FIG. 5 determines (e.g., via the condition analyzer 504) whether to adjust the roll stiffness of the vehicle 102 based on the condition detected at block 606. If the control system 500 provides a positive determination (block 608: YES), control of the example method 600 of FIG. 6 proceeds to block 610. On the other hand, in some examples, if the control system 500 provides a negative determination (block 608: NO), control of the example method 600 of FIG. 6 returns to block 604.

The example method 600 of FIG. 6 also includes operating the clutch mechanism to control torque transferred between the first and second bar members during a driving event (block 610). In some examples, the control system 500 of FIG. 5 operates (e.g., via the clutch interface 502) the clutch mechanism 120 to control torque (e.g., see the input torque 232 of FIG. 2A) transferred between the first and second bar members 122, 124 during the driving event of the vehicle 102 previously described. In particular, the control system 500 directs the fluid valve(s) 130, 132, 134 to change the state of the clutch mechanism 120, for example, between any of the first state, the second state, the third state, the fourth state, the fifth state, and/or the sixth state of the clutch mechanism 120. As previously described, changing the state of the clutch mechanism 120 changes the roll stiffness of the vehicle 102. For example, the roll stiffness of the vehicle 102 decreases in response to the control system 500 changing the clutch mechanism 120 from the first state to the second state. Conversely, in another example, the roll stiffness of the vehicle 102 increases in response to the control system 500 changing the clutch mechanism 120 from the second state to the first state.

In some examples (e.g., when the clutch mechanism 120 is in the second state thereof), the control system 500 can close the first and second fluid valves 130, 132 and open the third fluid valve 134 to change the clutch mechanism 120 from the second state thereof to the first state thereof. As a result, in such examples, the clutch mechanism 120 transfers the torque between the first and second bar members 122, 124 and/or substantially couples the first bar member 122 to the second bar member 124 via the fluid 238 and the fluid control members 224, 226. Conversely, in some examples (e.g., when the clutch mechanism 120 is in the first state thereof), the control system 500 can open the first and second fluid valves 130, 132 and close the third fluid valve 134 to change the clutch mechanism 120 from the first state thereof to the second state thereof. As a result, in such examples, the clutch mechanism 120 substantially ceases transferring the torque between the first and second bar members 122, 124 and/or substantially decouples the first bar member 122 from the second bar member 124 via the fluid 238 and the fluid control members 224, 226.

The example method 600 of FIG. 6 also includes determining whether to monitor the vehicle (block 612). In some examples, the control system 500 of FIG. 5 determines whether to monitor the vehicle 102. If the control system 500 provides a positive determination (e.g., the vehicle 102 is on) (block 612: YES), control of the example method 600 of FIG. 6 returns to block 604. On the other hand, if the control system 500 provides a negative determination (e.g., the vehicle 102 is off) (block 612: NO), the example method 600 of FIG. 6 ends.

Although the example method 600 is described in connection with the flowchart of FIG. 6, one or more other methods of implementing the examples disclosed herein may alternatively be used. For example, the order of execution of the blocks 602, 604, 606, 608, 610, 612 may be changed, and/or at least some operations of the blocks 602, 604, 606, 608, 610, 612 described may be changed, eliminated, or combined.

FIG. 7 illustrates a flowchart representative of an example method 610 that can be implemented to operate the clutch mechanism 120. The example method 610 of FIG. 7 can be implemented in any of the stabilizer bar disconnect system 100, the vehicle 102, the stabilizer bar assembly 110, and/or the control system 500 previously described. The operations of blocks 702, 704, 706, 708, 710 can be used to implemented block 610 of FIG. 6. In particular, the example method 610 of FIG. 7 is effective in operating the clutch mechanism 120 to control torque transferred between the first and second bar members 122, 124 during a certain driving event of the vehicle 102.

The example method 610 of FIG. 7 begins by obtaining, from a database, predefined valve configurations for fluid valves of the clutch mechanism (block 702). In some examples, the control system 500 of FIG. 5 obtains, from the database 510, predefined valve configurations for the first, second, and third fluid valves 130, 132, 134 of the clutch mechanism 120. As previously described, the database 510 can include the valve configuration data 514 stored therein, which indicates to the control system 500 certain positions of the respective fluid valves 130, 132, 134 associated with providing the different states of the clutch mechanism 120 (e.g., see the table 400 of FIG. 4).

The example method 610 of FIG. 7 also includes selecting one of the predefined valve configurations based on the condition associated with the vehicle (block 704). In some examples, the control system 500 of FIG. 5 selects one of the predefined valve configurations obtained at block 702 based on the condition associated with the vehicle 102 detected at block 606 of FIG. 6.

The example method 610 of FIG. 7 also includes opening or closing one or more of the fluid valves in accordance with the selected one of the predefined valve configurations (block 706). In some examples, the control system 500 of FIG. 5 opens or closes one or more of the fluid valve(s) 130, 132, 134 in accordance with the predefined valve configuration selected at block 704, which changes the state of the clutch mechanism 120 to a desired state.

The example method 610 of FIG. 7 also includes determining whether to adjust a characteristic of a fluid in the clutch mechanism (block 708). In some examples, the control system 500 of FIG. 5 determines whether to adjust the characteristic(s) of the fluid 238 of at least a portion thereof. If the control system 500 provides a positive determination (block 708: YES), control of the example method 610 of FIG. 7 proceeds to block 710. On the other hand, if the control system 500 provides a negative determination (block 708: NO), control of the example method 610 of FIG. 7 returns to a calling function such as the method 600 of FIG. 6.

The example method 610 of FIG. 7 also includes applying an electric current to the fluid or cease applying the electric current (block 710). In some examples, the control system 500 of FIG. 5 applies an electric current to the fluid 238 or ceases applying electric current to the fluid 238 via the means for applying the electric current. As previously described, in examples where the fluid 238 includes the MR fluid, the electric current can change the characteristic(s) of the fluid 238. In particular, the electric current can be particularly effective when applied to the fluid 238 while the clutch mechanism 120 is in the first state, which improves a connection between the first and second bar members 122, 124 provided by the clutch mechanism 120.

After performing the operation of block 710, control of the example method 610 of FIG. 7 returns to a calling function such as the method 600 of FIG. 6.

Although the example method 610 is described in connection with the flowchart of FIG. 7, one or more other methods of implementing the examples disclosed herein may alternatively be used. For example, the order of execution of the blocks 702, 704, 706, 708, 710 may be changed, and/or at least some operations of the blocks 702, 704, 706, 708, 710 described may be changed, eliminated, or combined.

FIG. 8 illustrates a flowchart representative of an example method 800 that can be implemented to reset positions of the fluid control members 224, 226 of the clutch mechanism 120. The example method 800 of FIG. 8 can be implemented in any of the stabilizer bar disconnect system 100, the vehicle 102, the stabilizer bar assembly 110, and/or the control system 500 previously described.

The example method 800 of FIG. 8 begins by communicating with one or more proximity sensors operatively coupled to a clutch mechanism of a vehicle stabilizer bar (block 702). In some examples, the control system 500 of FIG. 5 communicates (e.g., via the sensor interface 508) with one or more of the proximity sensor(s) 136 previously described. In particular, the control system 500 obtains sensor data from the proximity sensor(s) 136 indicative of one or more positional parameters associated with any of the first fluid control member 224, the second fluid control member 226, the first bar member 122, and/or the second bar member 124.

The example method 800 of FIG. 8 also includes detecting a relative position of a first fluid control member of the clutch mechanism via the proximity sensor(s) (block 804). In some examples, the control system 500 of FIG. 5 detects (e.g., via the sensor interface 508) the relative position of the first fluid control member 224 via the proximity sensor(s) 136.

The example method 800 of FIG. 8 also includes detecting a relative position of a second fluid control member of the clutch mechanism via the proximity sensor(s) (block 806). In some examples, the control system 500 of FIG. 5 detects (e.g., via the sensor interface 508) the relative position of the second fluid control member 226 via the proximity sensor(s) 136.

The example method 800 of FIG. 8 also includes determining a gap between the first and second fluid control members based on the relative positions (block 808). In some examples, the control system 500 of FIG. 5 determines (e.g., via the sensor interface 508) the gap 348 between the first and second fluid control members 224, 226 based on the relative positions detected at blocks 804 and 806. Additionally or alternatively, in some examples, the control system 500 can determine the gap 348 via the proximity sensor(s) 136, for example, in addition or alternatively to detecting the relative positions.

The example method 800 of FIG. 8 also includes determining whether a size of the gap is less than a threshold gap size (block 810). In some examples, the control system 500 of FIG. 5 determines (e.g., via the condition analyzer 504) whether the size of the gap 348 is less than the threshold gap size that may be stored in the database 510. If the control system 500 provides a positive determination (e.g., the size of the gap 348 is less than the threshold gap size) (block 810: YES), control of the example method 800 of FIG. 8 proceeds to block 812. On the other hand, if the control system 500 provides a negative determination (e.g., the size of the gap 348 is greater than or equal to the threshold gap size) (block 810: NO), control of the example method proceeds to block 816.

The example method 800 of FIG. 8 also includes determining one or more valve adjustments for fluid valves of the clutch mechanism associated with moving the fluid control member(s) (block 812). In some examples, the control system 500 of FIG. 5 determines (e.g., via the adjustment engine 506) one or more valve adjustments for the fluid valves 130, 132, 134 of the clutch mechanism 120 associated with moving the first fluid control member 224 and/or the second fluid control member 226.

The example method 800 of FIG. 8 also includes operating one or more of the fluid valves based on the valve adjustment(s) to urge the fluid control member(s) to move relative to each other (block 814). In some examples, the control system 500 of FIG. 5 operates (e.g., via the clutch interface 502) one or more of the fluid valve(s) 130, 132, 134 of the clutch mechanism 120 based on the valve adjustment(s) determined at block 812 to urge the fluid control member(s) 224, 226 to move relative to each other. In some such examples, the control system 500 is configured to selectively open and close one or more of the fluid valve(s) 130, 132, 134 to adjust (a) the relative position of the first fluid control member 224 and/or (b) the relative position of the second fluid control member 224. In particular, such selective valve control carried out by the control system 500 results in (a) the first fluid control member 224 moving (e.g., gradually) to the initial position thereof and/or (b) the second fluid control member 226 to moving (e.g., gradually) to the initial position thereof. In this manner, the control system 500 effectively increases the size of the gap 348 during vehicle operation.

After performing the operation of block 814, control of the example method 800 of FIG. 8 returns to block 804.

The example method 800 of FIG. 8 also includes determining whether to monitor the clutch mechanism (block 816). In some examples, the control system 500 of FIG. 5 determines whether to monitor the clutch mechanism 120. If the control system 500 provides a positive determination (e.g., the vehicle 102 is on) (block 816: YES), control of the example method 800 of FIG. 8 returns to block 804. On the other hand, if the control system 500 provides a negative determination (e.g., the vehicle 102 is off) (block 816: NO), the example method 800 of FIG. 8 ends.

Although the example method 800 is described in connection with the flowchart of FIG. 8, one or more other methods of implementing the examples disclosed herein may alternatively be used. For example, the order of execution of the blocks 802, 804, 806, 808, 810, 812, 814, 816 may be changed, and/or at least some operations of the blocks 802, 804, 806, 808, 810, 812, 814, 816 described may be changed, eliminated, or combined. In some examples, blocks 812 and 814 are eliminated and, after block 810, the method 800 of FIG. 8 may include disabling or deactivating a disconnected state of the clutch mechanism. In such examples, the control system 500 of FIG. 5 disables or deactivates (e.g., via the clutch interface 502) the second state of the clutch mechanism 120, for example, until the control system 500 determines that the size of the gap 348 is greater than or equal to the threshold gap size.

FIG. 9 is a block diagram of an example processor platform 900 structured to execute instructions to carry out the methods of FIGS. 6-8 and/or, more generally, to implement the stabilizer bar disconnect system 100 of FIGS. 1A and 1B and/or the control system 500 of FIG. 5. For example, the processor platform 900 can be a personal computer, a server, a mobile device (e.g., a cell phone, a smartphone, a tablet, etc.) or any other type of computing device. According to the illustrated example of FIG. 9, the processor platform 900 includes a central processing unit (CPU) 902 (sometimes referred to as a processor), which is hardware (e.g., one or more integrated circuits, logic circuits, microprocessors, etc.). The CPU 902 of FIG. 9 includes a local memory 904 such as, for example, a cache. In some examples, the CPU 902 implements the clutch interface 502, the condition analyzer 504, the adjustment engine 506, and the sensor interface 508, as shown in the example of FIG. 9.

Coded instruction(s) 906 to implement the methods of FIGS. 6-8 may be stored in a main memory 908 of the processor platform 900. The memory 908 may include a volatile memory (e.g., random access memory device(s) such as Dynamic Random Access Memory (DRAM)) and a non-volatile memory (e.g., flash memory). In the example of FIG. 9, the main memory 908 implements the example database 510 previously described. Such processes and/or instructions may also be stored on a storage medium disk 910 associated with the processor platform 900, such as a hard drive (HDD) or portable storage medium, or may be stored remotely. Further, the claimed advancements are not limited to the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processor platform 900 communicates, such as a server or computer for example.

Further, the claimed advancements may be provided as a utility application, background daemon, or component of an operating system, or combination thereof, executing in conjunction with the CPU 902 and an operating system such as, for example, Microsoft Windows 7, Microsoft Windows 10, UNIX, Solaris, LINUX, Apple MAC-OS or any other system(s) known to those skilled in the art.

The hardware elements in order to achieve the processor platform 900 may be realized by various circuitry elements, known to those skilled in the art. For example, the CPU 902 may be a Xenon or Core processor from Intel of America or an Opteron processor from AMD of America, or may be other processor types that would be recognized by one of ordinary skill in the art. Alternatively, the CPU 902 may be implemented on an FPGA, ASIC, PLD or using discrete logic circuits, as one of ordinary skill in the art would recognize. Further, the CPU 902 may be implemented as multiple processors cooperatively working in parallel to perform the instructions of the inventive processes described above.

In some examples, the processor platform 900 of FIG. 9 also includes a network controller 912 such as, for example, an Intel Ethernet PRO network interface card from Intel Corporation of America for interfacing with one or more networks 914. As can be appreciated, the network(s) 914 can be one or more public networks (e.g., the Internet), private networks (e.g., a LAN, a WAN, etc.) and/or sub-networks (e.g., a public switched telephone network (PSTN), an integrated services digital network (ISDN), etc.). The network(s) 914 can also be wired, such as an Ethernet network, or can be wireless such as a cellular network including EDGE, 3G and 4G wireless cellular systems. The wireless network can also be WiFi, Bluetooth, or any other wireless form of communication that is known.

The processor platform 900 of FIG. 9 includes a general purpose I/O interface circuit 916 that interfaces and/or otherwise communicates with one or more input devices 918 and/or one or more output devices 920. The I/O interface circuit 916 of FIG. 9 may be implemented as an Ethernet interface, a universal serial bus (USB), a PCI express interface, and/or any other type of standard interface.

The input devices 918 are connected to the I/O interface circuit 916 and may include, for example, a keyboard, a mouse, a touchscreen, a button, a microphone, a voice recognition system, a camera, and/or any other suitable device(s) for enabling a user to input data and/or commands to the CPU 902.

The output device(s) 920 are also connected to the I/O interface circuit 916 and may include display devices such as, for example, a light-emitting diode (LED), a liquid crystal display, a touchscreen, a printer, a scanner (e.g., an OfficeJet or DeskJet from Hewlett Packard), a speaker, and/or any other device(s) for providing or presenting information (e.g., visual information and/or audible information) to a user. As such, in some examples, the I/O interface circuit 916 includes a display controller 922 such as, for example, a NVIDIA GeForce GTX or Quadro graphics adaptor from NVIDIA Corporation of America for interfacing with a display (e.g., a Hewlett Packard HPL2445w LCD monitor). Additionally, in some examples, the I/O interface circuit includes a sound controller 924 such as, for example, Sound Blaster X-Fi Titanium from Creative, to interface with a speaker and/or a microphone.

The processor platform 900 of FIG. 9 also includes a general purpose storage controller 926 that connects the storage medium disk 910 with a communication bus 928. The storage controller 926 may also control access to the memory 908. The communication bus 928 of FIG. 9 may be an ISA, EISA, VESA, PCI, etc. for interconnecting all of the components of the processor platform 900. For example, the CPU 902 communicates with the main memory 908 via the bus 928.

It will be appreciated that the systems, apparatus, and methods disclosed in the foregoing description provide numerous advantages. Examples disclosed herein provide a low-profile, lightweight, and simple solution to advantageously control vehicle roll stiffness. Some disclosed examples provide a clutch mechanism that operatively couples two bar members of a vehicle stabilizer bar together and controls torque transferred between the two bar members during vehicle operation. Additionally, examples disclosed herein improve vehicle safety in certain driving conditions associated with electrical power failure while also reducing mass and/or a volumetric footprint associated with such a clutch mechanism.

Although certain example systems, apparatus, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A stabilizer bar disconnect system for a vehicle, comprising:
 a stabilizer bar on the vehicle; and
 a fluidic clutch operatively interposed between first and second bar members of the stabilizer bar, the fluidic clutch configured to control torque transferred between the first and second bar members during a driving event to control a roll stiffness of the vehicle, the fluidic clutch including:
  a housing rotatably coupled to the first and second bar members,
  a fluid chamber in the housing to receive a fluid,
  a fluid reservoir external to the fluid chamber and in fluid communication with the fluid chamber, wherein the housing includes a first portion defining the fluid chamber and a second portion defining the fluid reservoir, the first portion being internal to the second portion,
  first and second fluid control members in the fluid chamber and connected to respective ones of the first and second bar members, relative rotation of the first or second fluid control member about an axis changing a parameter of the fluid,
  fluid valves operatively coupled to the housing and configured to control a flow of the fluid through the fluid chamber and the fluid reservoir,
  a spool centrally disposed in the fluid chamber, each of the first and second fluid control members interposed between an outer sealing surface on the spool and an inner sealing surface on a portion of the housing, and
  a wall attaching the spool to the portion of the housing, the wall extending away from the inner sealing surface radially inward relative to the axis toward the spool,
 wherein the fluidic clutch is changeable between (a) a connected state in which the fluidic clutch couples the first bar member to the second bar member and (b) a disconnected state in which the fluidic clutch decouples the first bar member from the second bar member.

2. The stabilizer bar disconnect system of claim 1, wherein energy input to the fluidic clutch is transmittable through the fluid from the first fluid control member to the second fluid control member when the fluidic clutch is in the connected state, and wherein the energy input to fluidic clutch is dissipated therein when the fluidic clutch is in the disconnected state.

3. The stabilizer bar disconnected system of claim 1, wherein the connected state of the fluidic clutch activates in response to the fluid valves changing from a powered state to an unpowered state.

4. The stabilizer bar disconnect system of claim 1, wherein:
 the first fluid control member and the wall, together, partially define a first section of the fluid chamber,
 the second fluid control member and the wall, together, partially define a second section of the fluid chamber adjacent the first section,
 the first and second fluid control members, together, partially define a third section of the fluid chamber between the first and second sections, and
 the fluid is flowable between at least two sections of the fluid chamber.

5. The stabilizer bar disconnect system of claim 4, wherein;
 a first fluid valve of the fluid valves is fluidly interposed between the first section of the fluid chamber and the fluid reservoir,
 a second fluid valve of the fluid valves is fluidly interposed between the second section of the fluid chamber and the fluid reservoir,
 a third fluid valve of the fluid valves is fluidly interposed between the first and second sections of the fluid chamber, and
 the fluidic clutch includes an orifice on the portion of the housing and fluidly interposed between the third section of the fluid chamber and the fluid reservoir.

6. The stabilizer bar disconnect system of claim 4, wherein the fluid clutch includes fluid seals positioned at inner and outer radial portions of the respective first and second fluid control members to prevent the fluid from leaking between the first, second, and third sections of the fluid chamber.

7. The stabilizer bar disconnect system of claim 1, wherein the fluidic clutch includes travel stops coupled to the housing and radially distributed relative to the axis, the travel stops configured to limit relative rotation of the first and second fluid control members.

8. The stabilizer bar disconnect system of claim 1, wherein the first portion defining the fluid chamber is cylindrically-shaped, and the second portion defining the fluid reservoir is cylindrically-shaped.

9. The stabilizer bar disconnect system of claim 1, wherein the fluid includes a magnetorheological (MR) fluid, and wherein the fluidic clutch including means for applying an electric current to the MR fluid to change a characteristic of the MR fluid.

10. The stabilizer bar disconnect system of claim 1, further including control circuitry communicatively coupled to the fluid valves, wherein the control circuitry is configured to operate one or more of the fluid valves to change the state of the fluidic clutch between the connected state and the disconnected state.

11. The stabilizer bar disconnected system of claim 10, wherein the control circuitry is configured to operate the fluid valves to change the fluidic clutch to a partially connected state in which the fluidic clutch partially couples the first bar member to the second bar member.

12. The stabilizer bar disconnect system of claim 10, further including one or more sensors in the fluidic clutch, wherein the control circuitry is configured to:
 determine, via the one or more sensors, a gap between the first and second fluid control members, and
 in response to determining that a size of the gap is less than a threshold gap size, disable the disconnected state of the fluidic clutch until the size of the gap is greater than or equal to the threshold gap size.

13. The stabilizer bar disconnect system of claim 12, wherein the control circuitry is configured to selectively open and close one or more of the fluid valves to urge the first or second fluid control member to move toward or to an initial position thereof.

14. A vehicle stabilizer bar assembly, comprising:
 a first bar member connectable to a first side of a vehicle;
 a second bar member connectable to a second side of a vehicle; and
 a clutch mechanism operatively coupling the first bar member to the second bar member, the clutch mechanism configured to control torque transferred between the first and second bar members during a driving event to control a roll stiffness of the vehicle, the clutch mechanism including:
a housing interposed between the first and second bar members,
a fluid chamber in the housing to receive a fluid,
a fluid reservoir external to the fluid chamber and in fluid communication with the fluid chamber, wherein the housing includes a first portion defining the fluid chamber and a second portion defining the fluid reservoir, the first portion being internal to the second portion,
first and second fluid control members connected to the respective first and second bar members and extending through the fluid chamber along an axis, relative rotation of the first or second fluid control member about the axis changing a parameter of the fluid,
fluid valves operatively coupled to the housing to control a flow of the fluid through the fluid chamber and the fluid reservoir,
a spool centrally disposed in the fluid chamber, each of the first and second fluid control members interposed between an outer sealing surface on the spool and an inner sealing surface on a portion of the housing, and
a wall attaching the spool to the portion of the housing, the wall extending away from the inner sealing surface radially inward relative to the axis toward the spool,
wherein one or more of the fluid valves are configured to change position to adjust energy transmitted through the fluid from the first fluid control member to the second fluid control member.

15. The vehicle stabilizer bar assembly of claim 14, wherein the clutch mechanism is configured to couple the first bar member to the second bar member or decouple the first bar member from the second bar member based on positions of the respective fluid valves.

16. The vehicle stabilizer bar assembly of claim 15, wherein clutch mechanism couples the first bar member to the second bar member when the fluid valves are in an unpowered state.

* * * * *